(12) United States Patent
Nagata

(10) Patent No.: US 10,063,553 B2
(45) Date of Patent: Aug. 28, 2018

(54) PROGRAMMABLE DISPLAY

(71) Applicant: OMRON Corporation, Kyoto-shi, Kyoto (JP)

(72) Inventor: Yuta Nagata, Kusatsu (JP)

(73) Assignee: OMRON Corporation, Kyoto-shi (JP)

( * ) Notice: Subject to any disclaimer, the term of this patent is extended or adjusted under 35 U.S.C. 154(b) by 129 days.

(21) Appl. No.: 14/951,563

(22) Filed: Nov. 25, 2015

(65) Prior Publication Data

US 2016/0219054 A1    Jul. 28, 2016

(30) Foreign Application Priority Data

Jan. 22, 2015  (JP) .................................. 2015-010459

(51) Int. Cl.
| | |
|---|---|
| *G06F 3/14* | (2006.01) |
| *G06F 17/30* | (2006.01) |
| *H04L 29/06* | (2006.01) |
| *G06F 9/451* | (2018.01) |
| *G06F 21/31* | (2013.01) |

(Continued)

(52) U.S. Cl.
CPC ............... *H04L 63/10* (2013.01); *G06F 3/14* (2013.01); *G06F 3/1454* (2013.01); *G06F 9/452* (2018.02);

(Continued)

(58) Field of Classification Search
CPC . G06F 3/14; G06F 17/30; H04L 67/02; H04L 67/306

(Continued)

(56) References Cited

U.S. PATENT DOCUMENTS

| | | | |
|---|---|---|---|
| 2001/0056545 A1* | 12/2001 | Takechi ................. | G06F 21/33 726/26 |
| 2003/0220715 A1* | 11/2003 | Kneifel, II ............. | B25J 9/1682 700/248 |

(Continued)

FOREIGN PATENT DOCUMENTS

| | | |
|---|---|---|
| CN | 1542578 A | 11/2004 |
| CN | 101048712 A | 10/2007 |

(Continued)

OTHER PUBLICATIONS

The Chinese Office Action dated Feb. 6, 2018 in a counterpart Chinese Patent application.

*Primary Examiner* — Joseph P Hirl
*Assistant Examiner* — Kalish Bell
(74) *Attorney, Agent, or Firm* — Metrolexis Law Group, PLLC

(57) ABSTRACT

A programmable display for connection to a control device includes: a user management unit configured to identify a user accessing the programmable display; a generation unit configured to generate an interface screen containing information from the control device in accordance with privileges assigned the user identified by the user management unit; a display unit configured to output the interface screen; a connection management unit configured to, in response to a request for access from a user on an external device, establish a connection with the external device on the basis of identification of the user by the user management unit, and to send the interface screen to an external device with which a connection is established; and the user management unit prohibits simultaneous access to the programmable display by a plurality of users each having different privileges assigned.

20 Claims, 32 Drawing Sheets

(51) Int. Cl.
  *G06F 21/62* (2013.01)
  *G06F 21/84* (2013.01)
  *H04N 1/44* (2006.01)
  *G06F 21/44* (2013.01)
  *H04N 1/00* (2006.01)

(52) U.S. Cl.
  CPC ............ *G06F 21/31* (2013.01); *G06F 21/445* (2013.01); *G06F 21/62* (2013.01); *G06F 21/84* (2013.01); *H04L 63/08* (2013.01); *H04L 63/104* (2013.01); *H04L 67/38* (2013.01); *H04N 1/00204* (2013.01); *H04N 1/4433* (2013.01); *G09G 2358/00* (2013.01); *H04N 2201/0089* (2013.01)

(58) Field of Classification Search
  USPC ...................................... 726/2, 3, 16, 26–28
  See application file for complete search history.

(56) References Cited

U.S. PATENT DOCUMENTS

| | | |
|---|---|---|
| 2004/0260408 A1 | 12/2004 | Scott et al. |
| 2004/0263636 A1* | 12/2004 | Cutler ...................... H04N 7/15 |
| | | 348/211.12 |
| 2006/0015195 A1* | 1/2006 | Lehman ............ G05B 19/0428 |
| | | 700/83 |
| 2009/0089709 A1* | 4/2009 | Baier .................. G05B 19/409 |
| | | 715/817 |
| 2015/0100624 A1* | 4/2015 | Backhouse ........... H04L 63/029 |
| | | 709/203 |

FOREIGN PATENT DOCUMENTS

| | | |
|---|---|---|
| JP | 2008-033573 A | 2/2008 |
| WO | 2006/019909 A1 | 2/2006 |

\* cited by examiner

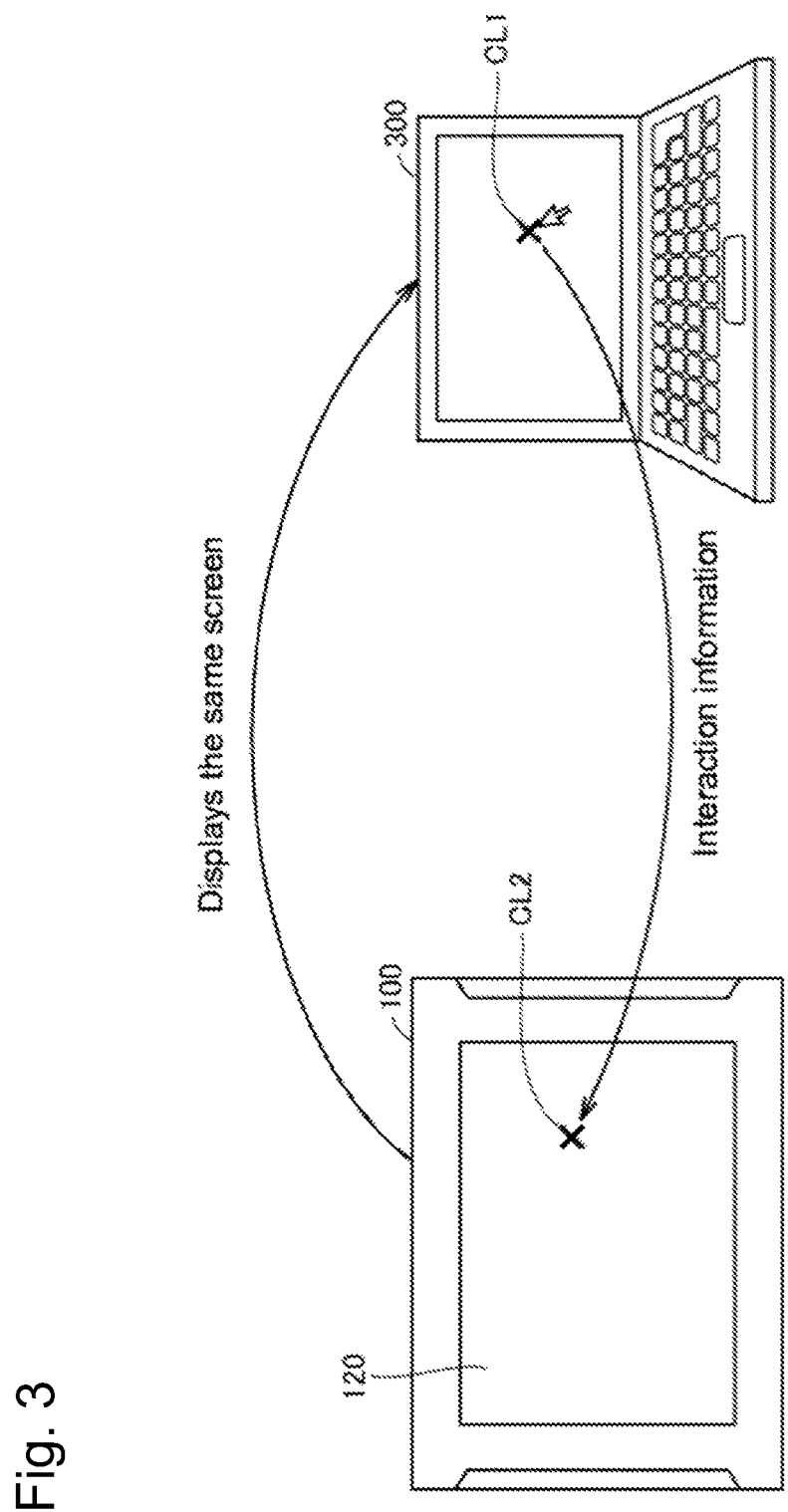

Fig. 4A

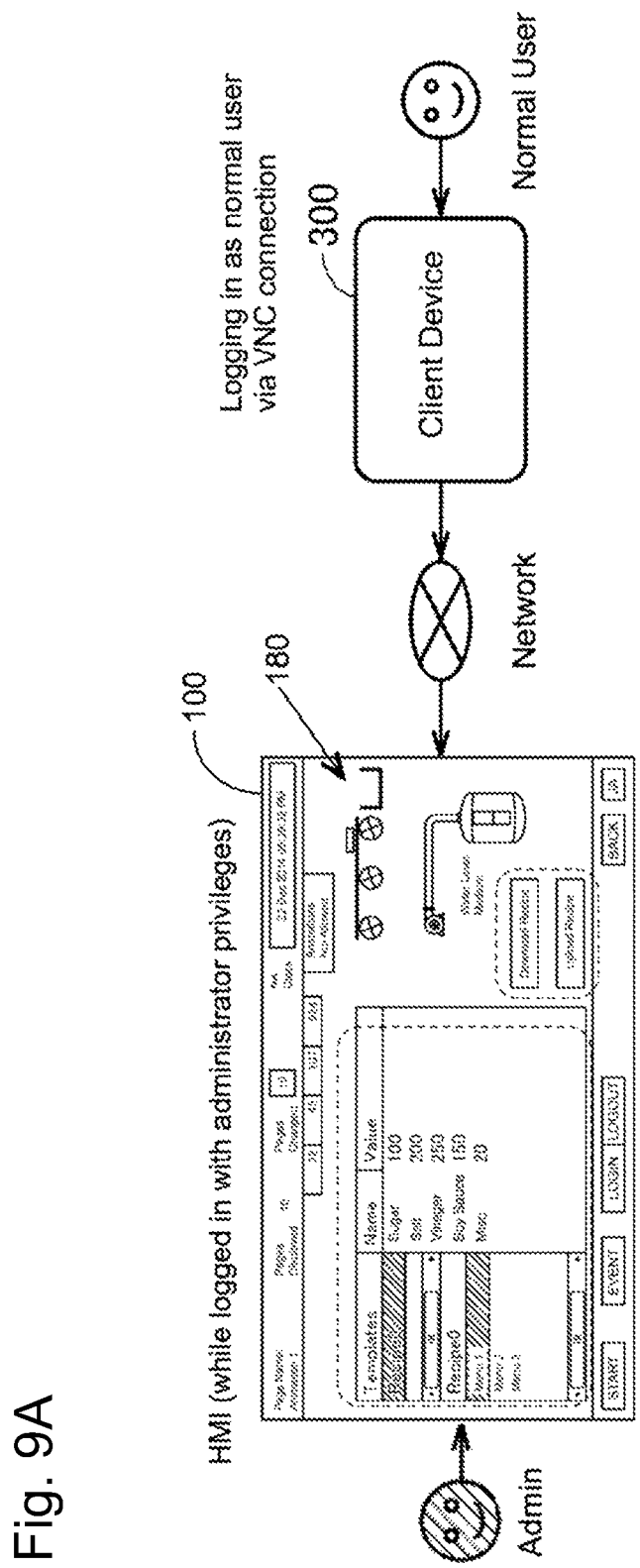

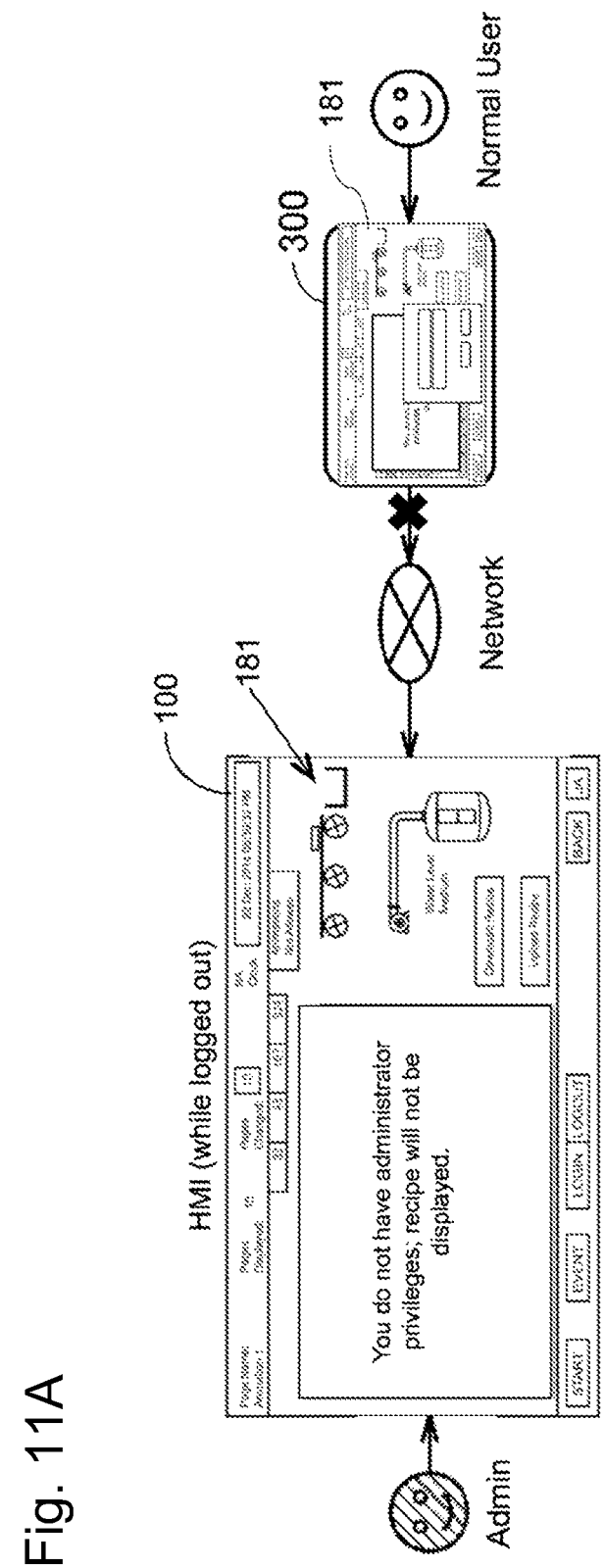

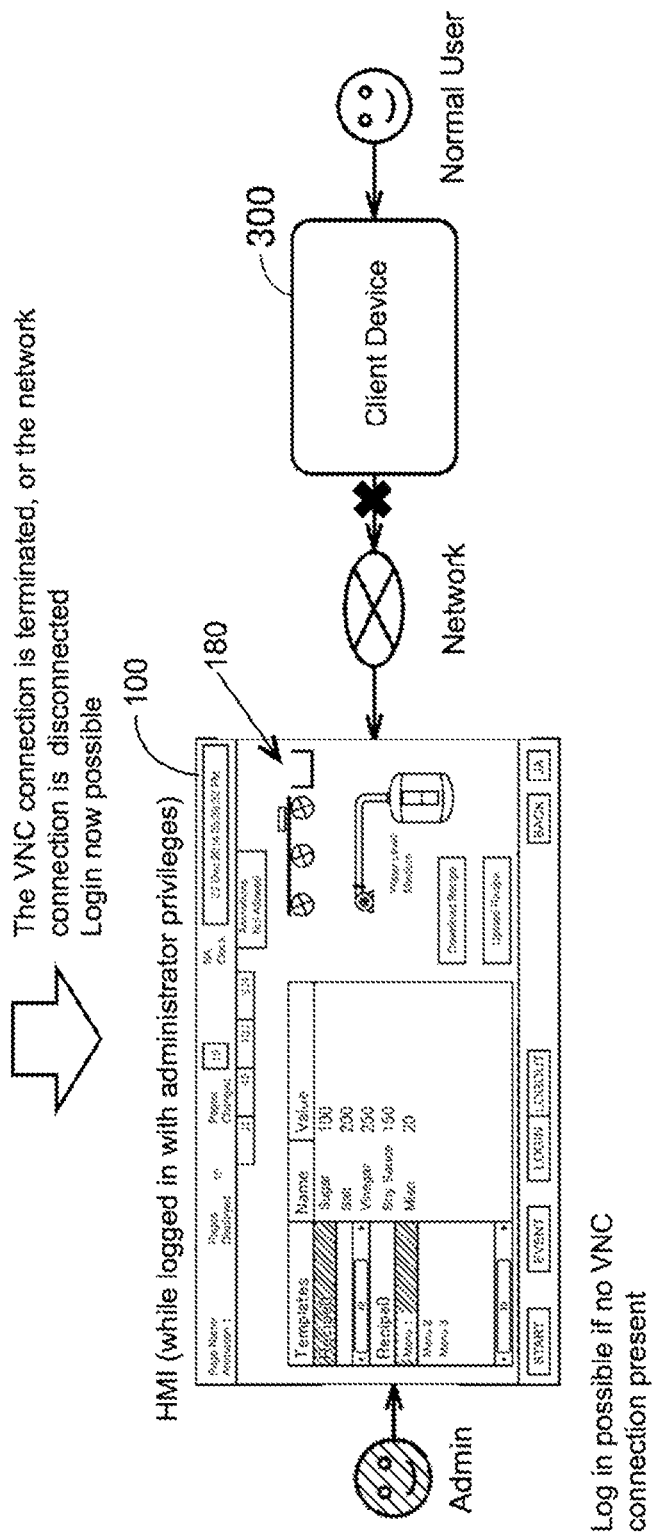

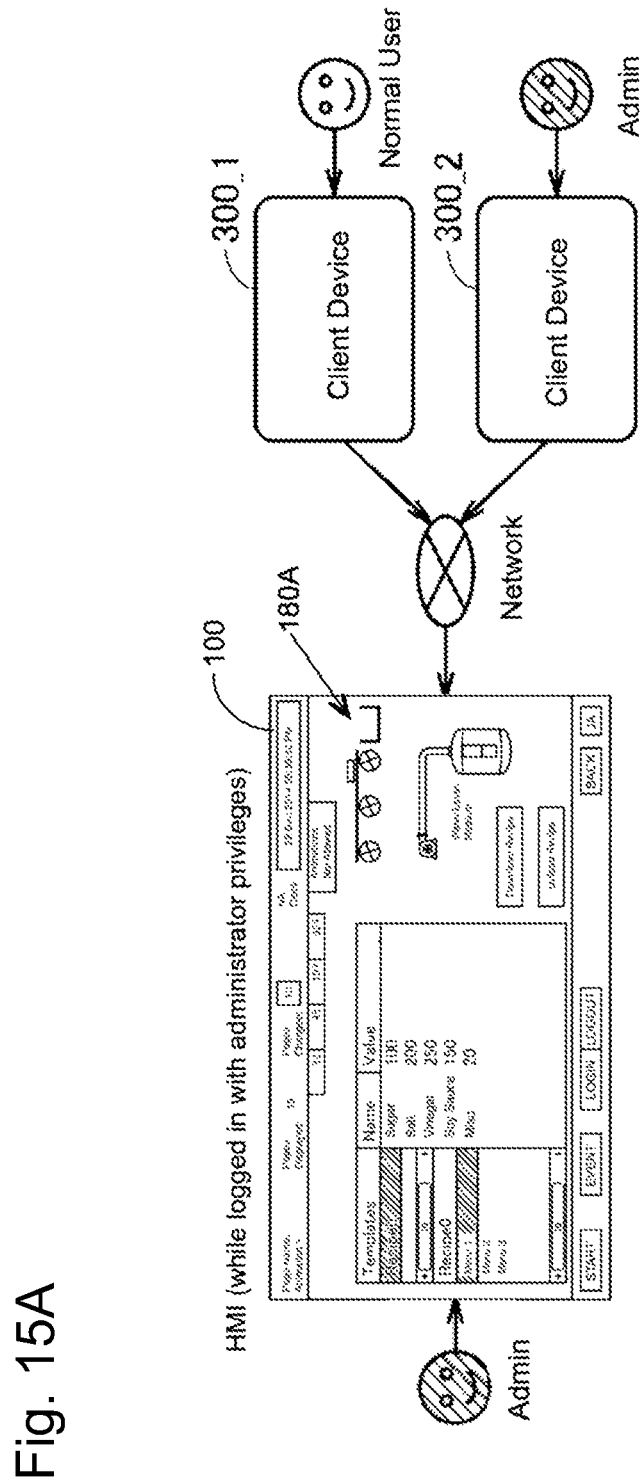

PROGRAMMABLE DISPLAY

FIELD

The present invention relates to a programmable display that allows viewing of and interaction with a control system that includes a control device.

BACKGROUND

At a typical production site, manufacturing devices, robots, and the like are controlled using a control device called a programmable logic controller (PLC). The demand for efficiency and these production sites and the progress made in Information and Communication Technology and the like has led to the development of technologies that allow for remote viewing and interaction using networking technologies.

For instance, Japanese Unexamined Patent Application Publication No. 2008-33573 (Patent Document 1) discloses remotely displaying a screen displayed by a programmable display, and allowing interactions identical to that with a programmable display on the screen being displayed. More specifically, the programmable display described in Japanese Unexamined Patent Application Publication No. 2008-33573 use is a Virtual Network Computing (VNC) server to transmit an image of the screen being displayed thereon (image data) to a plurality of client computers.

Technical Problem

However it must be said that there are issues with security regarding the programmable display described in the above Japanese Unexamined Patent Application Publication No. 2008-33573, because the image of the screen being displayed (image data) is transmitted as is to a plurality of client computers. At a production site, for example numerous activities require tacit knowledge, and it is necessary to restrict the number of persons capable of accessing this kind of information. On one hand, the viewing and control of a manufacturing device requires this kind of tacit knowledge which is also presented on the programmable display. However, given that the programmable display described in Japanese Unexamined Patent Application Publication No. 2008-33573 allows all the information displayed thereby to treat is presented to all the client computers regardless of the security access level or the importance, the programmable display cannot appropriately protect the above-described tacit knowledge.

Therefore, for a programmable display that allows remote viewing of content displayed thereon what is desired is a configuration therefor that appropriately preserves the security level of the content displayed.

SUMMARY

A programmable display is provided for connection to a control device. According to embodiments of the invention the programmable display includes: a user management unit configured to identify a user accessing the programmable display; a generation unit configured to generate an interface screen containing information from the control device in accordance with privileges assigned the user identified by the user management unit; a display unit configured to output the interface screen; a connection management unit configured to, in response to a request for access from a user on an external device, establish a connection with the external device on the basis of identification of the user by the user management unit, and to send the interface screen to an external device with which a connection is established; and the user management unit prohibits simultaneous access to the programmable display by a plurality of users each having different privileges assigned.

The user management unit may terminate access to the programmable display as a first user assigned a first privilege when a second user assigned a second privilege that is lower than the first privilege attempts to access the programmable display while the first user assigned the first privilege is accessing the programmable display.

Alternatively, the user management unit may notify a first user assigned a first privilege of a second user assigned a second privilege that is lower than the first privilege attempting to access the programmable display when the second user attempts to access the programmable display while the first user is accessing the programmable display.

Furthermore, the user management unit may deny the access of the second user to the programmable display in response to an instruction from the first user.

Alternatively, the user management unit may terminate access to the programmable display as the first user in response to an instruction from the first user.

The user management unit may permit the second user to access the interface screen with greater limitations than the limitations on the first user in response to an instruction from the first user.

The user management unit may restricts a second user assigned a second privilege lower than a first privilege from access to an interface screen generated for a first user assigned the first privilege.

Effects

Embodiments of the invention allow a programmable display that allows remote viewing of the content displayed thereon, to appropriately preserve the security level of the content displayed.

BRIEF DESCRIPTION OF THE DRAWINGS

FIG. 3 is a schematic view for describing the viewing and operation functions provided by the programmable display according to an embodiment;

FIGS. 4A and 4B illustrates an example of the contents displayed on an HMI screen presented by the programmable display according to an embodiment;

FIGS. 9A, 9B, 9C, and 9D are schematic views for describing a first example of the processing performed in a programmable display according to an embodiment;

FIGS. 11A, 11B, and 11C are schematic views for describing the first example of the processing performed in a programmable display according to an embodiment;

FIGS. 15A, 15B, and 15C are schematic views for describing a second example of the processing performed in a programmable display according to an embodiment;

DETAILED DESCRIPTION

Figure 1:
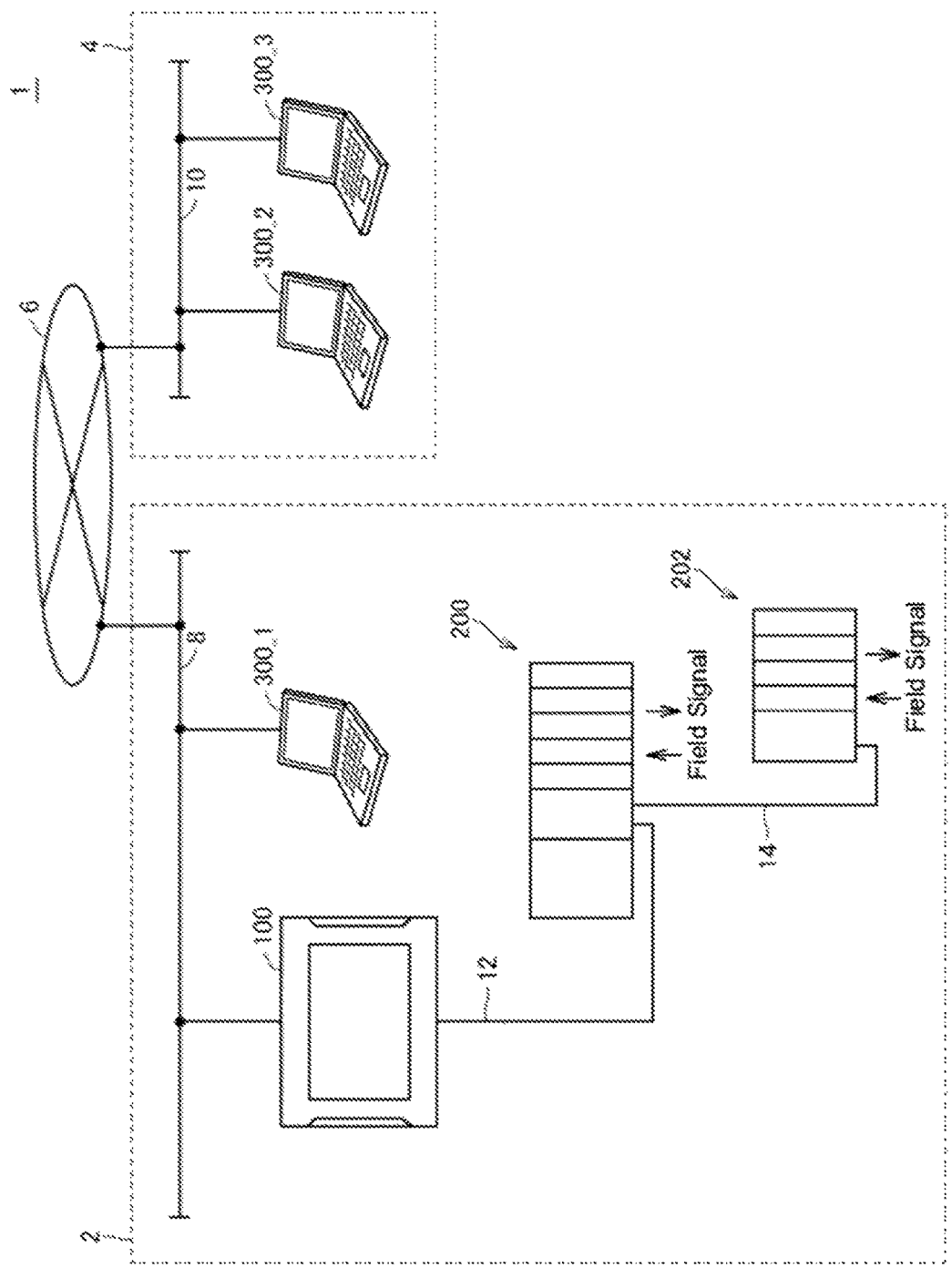
FIG. 1 is a schematic view illustrating an overall configuration of a control system according to an embodiment.

Embodiments of the present invention will be described in detail with reference to the drawings. The same or corresponding elements within the drawings will be given the same reference numerals and the explanations therefor will not be repeated. In discussing the embodiment, a control system 1 containing a programmable display 100 and a control device 200 is described. However, the control system 1 as described below is merely an example of the application of the programmable display 100; the technical scope of the invention of the present application should be logically interpreted on the basis of the description in the claims. Note that, in the following description the programmable display 100 is sometimes merely referred to as display 100.

A. OVERALL CONFIGURATION OF CONTROL SYSTEM 1

First, an overall configuration of a control system 1 according to the embodiment is described. FIG. 1 is a schematic view illustrating an overall configuration of a control system according to an embodiment. Referring to FIG. 1, the control system 1 includes a production site 2 where actual manufacturing operations are carried out, and a remote site 4 from which the production site 2 remote viewing or operation may take place. The production site 2 and the remote site 4 are connected through a desired network 6 such as the Internet, or a Virtual Private Network (VPN). Note that communications between the production site 2 of the remote site 4 are preferably secure; typically the technique adopted may be to encrypt the data transmitted and received, and/or to ensure that the communication line itself is secure.

A control device 200 and a display 100 are arranged at the production site 2. The control device 200 is used to control a manufacturing device, a robot or the like, and the display 100 is connected to the control device 200.

The control device 200 is an industrial controller (referred to as a programmable logic controller, PLC) that exchanges field signals between controlled devices (manufacturing device, or robot, and the like) to thereby control the devices. The field signals are (analog and/or digital) input signals detected by various sensors, and the (analog and/or digital) output signals provided to various actuators.

At the production site 2, a remote input-output (I/O) device 202 is connected to the control device 200 via a field bus 14. The remote I/O device 202 exchanges field signals between the control device 200 and a controlled device located at a separate location away from the control device.

The display 100 is also connected to the control device 200 via a field bus 12. The display 100 presents a user with information retained in the control device 200 and sends internal commands to the control device 200 in accordance with interactions from the user. A human machine interface screen (HMI) displayed on the display 100 can be prepared by a user as desired and typically is made up to display screens and information supporting the production site 2.

The display 100 according to the embodiment includes a function that transmits the contents displayed to an external device (generally referred to below as a "client device 300"). The types of external device is not particularly limited so long as the device is capable of communicating by some means to the display 100; for instance, the external device may be a personal computer, a smart phone, or a different programmable display. The methods that may be used to communicate with the programmable display 100 may be any publicly known method such as universal serial bus (USB) communication, serial communication, parallel communication, a wired network such as Ethernet (Registered Trademark), a wireless network such as wireless LAN or BLUETOOTH (Registered Trademark).

Within the control system in FIG. 1, personal computers are provided as examples of the client device 300, and these personal computers may be directly or indirectly connected to the display 100 via a network. More specifically, a client device 300_1 is placed at the production site 2 and connected it to the display 100 via a network 8; client devices 300_2, 300_3 are placed at the remote site and connected to the display 100 via a network 6 and a network 10.

Each of the client devices 300_1 to 300_3 (referred to generally below as "client device 300") accesses the display 100 to provide a user with a user interface from the display 100 (i.e., presenting a user with contents displayed on the display 100, and issuing internal commands responsive to interactions from the user). In other words, through the client device 300 a user may view and interact with the display 100 as if sitting in front of the display 100. In the description that follows, for convenience these kinds of functions provided the display 100 is referred to as the "remote viewing and operation function".

B. HARDWARE CONFIGURATION OF DISPLAY 100

Figure 2:
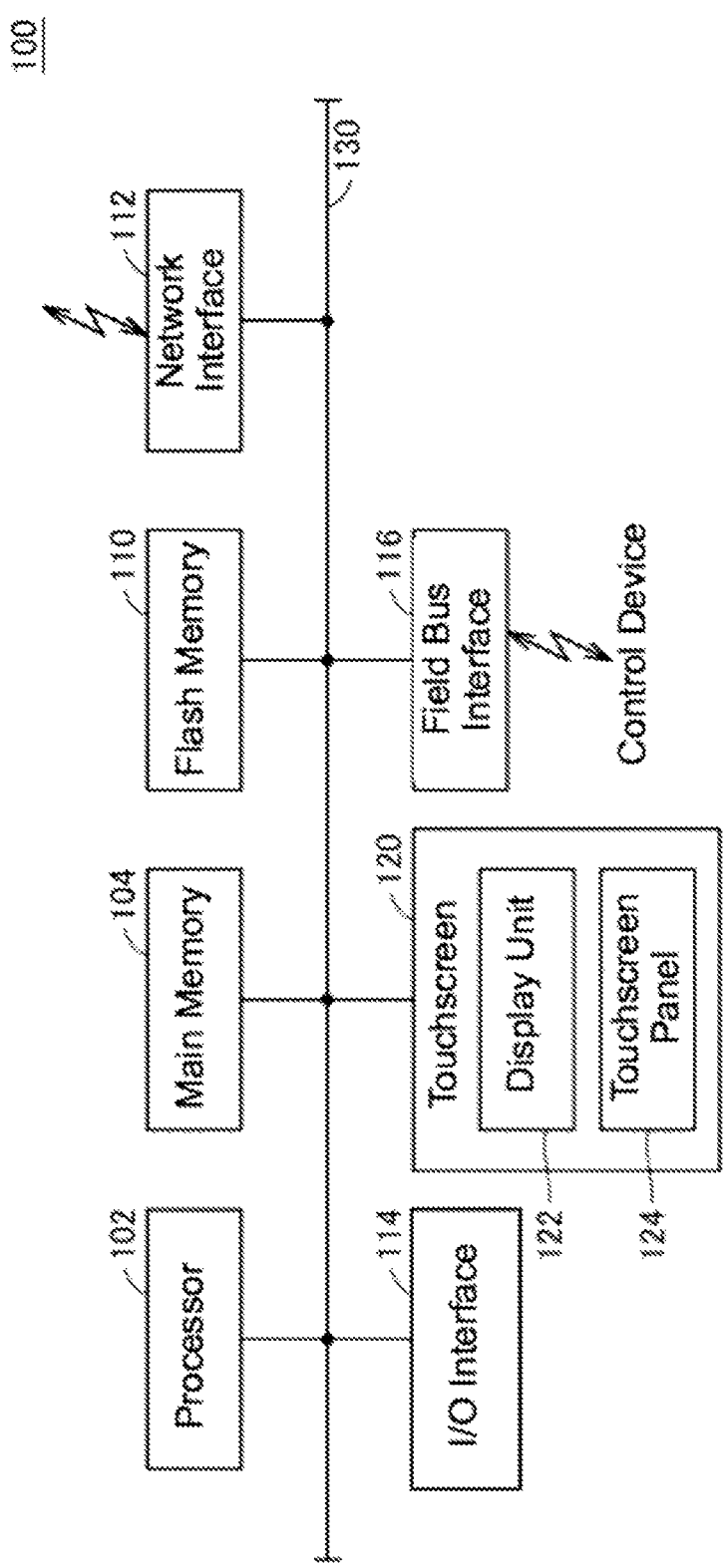
FIG. 2 is a block diagram illustrating a hardware configuration in a programmable display according to an embodiment.

Next, the hardware configuration of the display 100 is described. FIG. 2 is a block diagram illustrating a hardware configuration in a display 100 according to an embodiment. The display 100 according to the embodiment possesses a hardware configuration that has a general-purpose architecture. That is, the display 100 may be implemented as one kind of personal computer. The display 100 may be implemented in not only general-purpose hardware, but also in dedicated hardware.

More specifically, referencing FIG. 2, the display 100 includes: a processor 102 such as a central processing unit (CPU) or a microprocessing unit (MPU); a main memory 104; a flash memory 110; a network interface 112; an input output (I/O) interface 114, a field bus interface 116 and a touchscreen 120. These components are capable of data communication with each other via an internal bus 128.

The processor 102 executes programs pre-installed on the display 100 to thereby implement the various later described functions and processes. That is, the processor 102 reads a system program and a user program (not shown) stored in the flash memory 110 into the main memory 104, and executes the system program and the user program to implement control of the controlled device. Namely, the processor 102 coordinates between the main memory 104 and the flash memory 110 to implement a control unit that executes control computations.

The data exchange between the display 100 and then external device is mediated by the network interface 112, the I/O interface 114, and the field bus interface 116. More specifically, the network interface 112 mediates communication with the client device 300 via the network 8 and the like (FIG. 1). For instance, a component capable of communication in accordance with the Ethernet protocol may be adopted as the network interface 112. The I/O interface 114 mediates the communication with the various user interface devices such as a keyboard and a mouse. For instance a component capable of communication via USB or serial communications may be adopted as the I/O interface 114. The field bus interface 116 mediates the exchange of data with the control device 200. A component capable of communication in accordance with the EtherCAT (Registered Trademark) protocol, or similar to the network interface 112, a component capable of communication in accordance with the Ethernet protocol may be inducted as a field bus interface 116.

The touchscreen 120 presents various kinds of information to the user and accepts input from the user. More specifically, the touchscreen 120 includes a display unit 122 and a touchscreen panel 124. Typically the display unit 122 is constituted by a liquid crystal display (LCD) or an organic (electroluminescence) display unit the touchscreen panel 124 is mounted on the display unit 122 and accepts touch-based input from the user. In general, a pressure-sensitive or piezo-switch type device may be used in the display unit 122.

C. HARDWARE CONFIGURATION OF CONTROL DEVICE 200 AND CLIENT DEVICE 300

A PLC is usually adopted for the control device 200. Since the hardware configuration of a PLC is common knowledge, a detailed explanation therefor is not provided here.

Additionally, a general-purpose personal computer is usually adopted as the client device 300. Since the hardware configuration of a general-purpose personal computer is common knowledge, a detailed explanation therefor is not provided here. However, note that a program is installed on the client device 300 for exchanging data with the display 100 (later described).

D. REMOTE VIEWING AND OPERATION FUNCTION

Next, the remote viewing and operation function provided by the display 100 is described. FIG. 3 is a schematic view for describing the remote viewing and operation function provided by the display 100 according to an embodiment. Referring to FIG. 3, the display 100 transmits content identical to the content displayed (dual-sided display) on the touchscreen 120 (more accurately, the display unit 122) to the client device 300. The display unit for the client device 300 presents the contents transmitted thereto. In addition, when the content (screen display) presented on the display unit of the client device 300 is subject to some kind of user interaction CL1, processing is executed that is identical to when the touchscreen 120 (more accurately, the touchscreen panel 124) is subject to a user interaction CL2 which corresponds to the user interaction CL1. That is, input information representing the screen display presented on the client device 300 and the positional relationship of the user interaction CL1 thereon is sent to display 100, and the display 100 executes input processing in accordance with input entered corresponding to the input information.

Namely, the client device 300 acts as a type of clone of the display 100.

This kind of remote viewing and operation function may be implemented using any desired technology, however typically a virtual network computing (VNC) is used to implement this function. A module installed on the display 100 according to the embodiment functions as a VNC server so that the display 100 may provide the remote viewing and operation function to the client device 300. A software configuration for the display 100 is described later.

E. SECURITY LEVEL SETTING FUNCTION

The display 100 according to the embodiment includes a user identification function and a function that changes the content displayed in accordance with the privileges established for a user. In the description that follows, for convenience these functions are referred to as the "security level setting function".

The user identification function may be implemented by adding an authentication function that requires each user using the system to enter a user name and a password, or requiring entry of a user name and a password (or only a password) only when the device is in a specific mode. In the latter case, the user identification function may identify a user as a normal user if a user name and password is not entered.

As a simple example, consider that the user identification function can create a user having administrator privileges (also referred to below as an "administrator"), and a user having no administrator privileges, in other words a user having only normal user privileges (also referred to below as a "normal user"). In this case, for instance, the user identification function may require at least a password only when a user having administrator privileges (administrator) is using the programmable display as an administrator. Note that the methods for user authentication are not limited to password authentication, and any desired and commonly known methods may be adopted such as various kinds of biometric authentication, e.g., fingerprint authentication, face authentication, voiceprint authentication, or authentication using an IC card.

Finally, the display 100 becomes capable of changing the content displayed in accordance with the privileges possessed by a user.

Figure 4A:
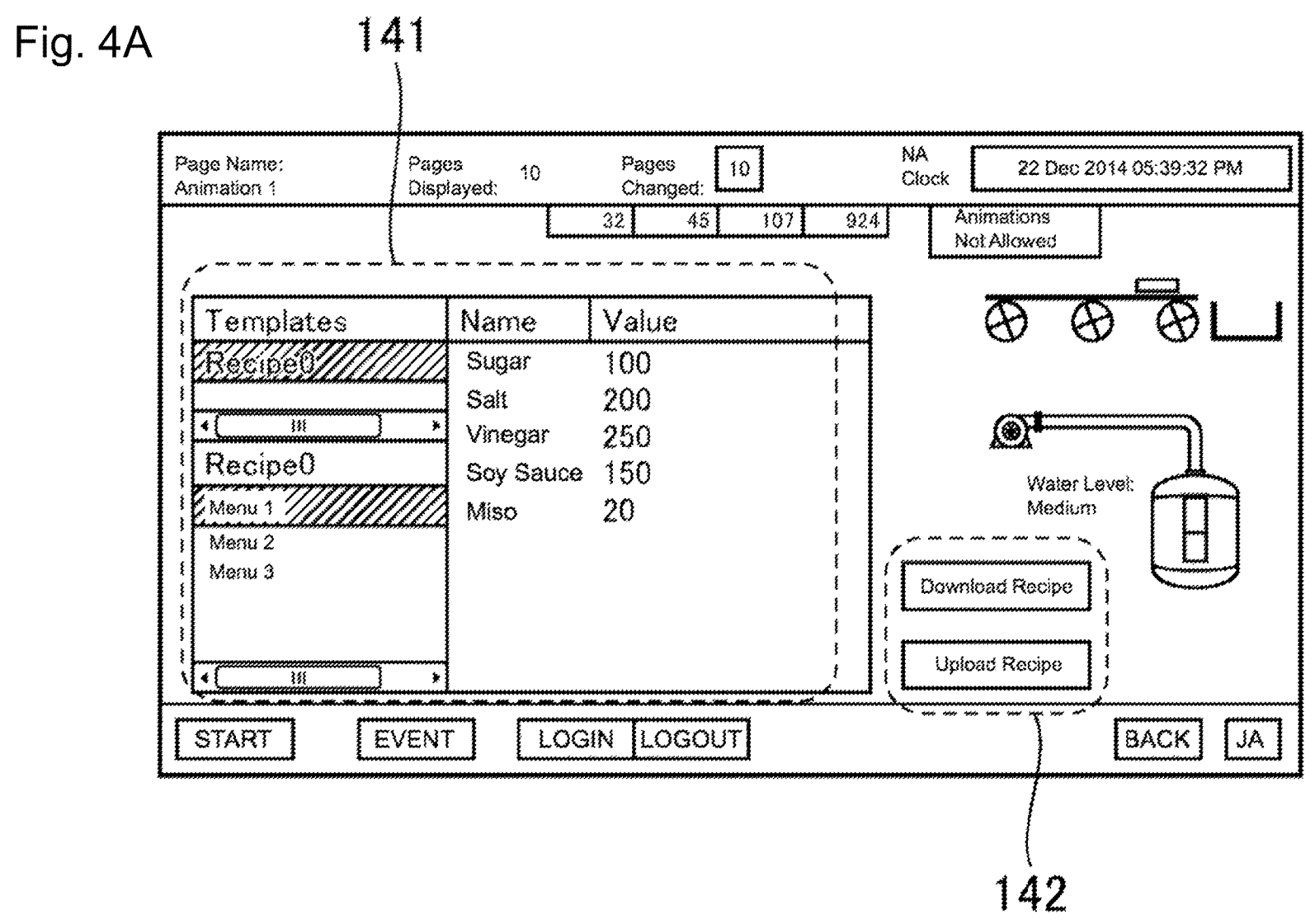
Figure 4B:
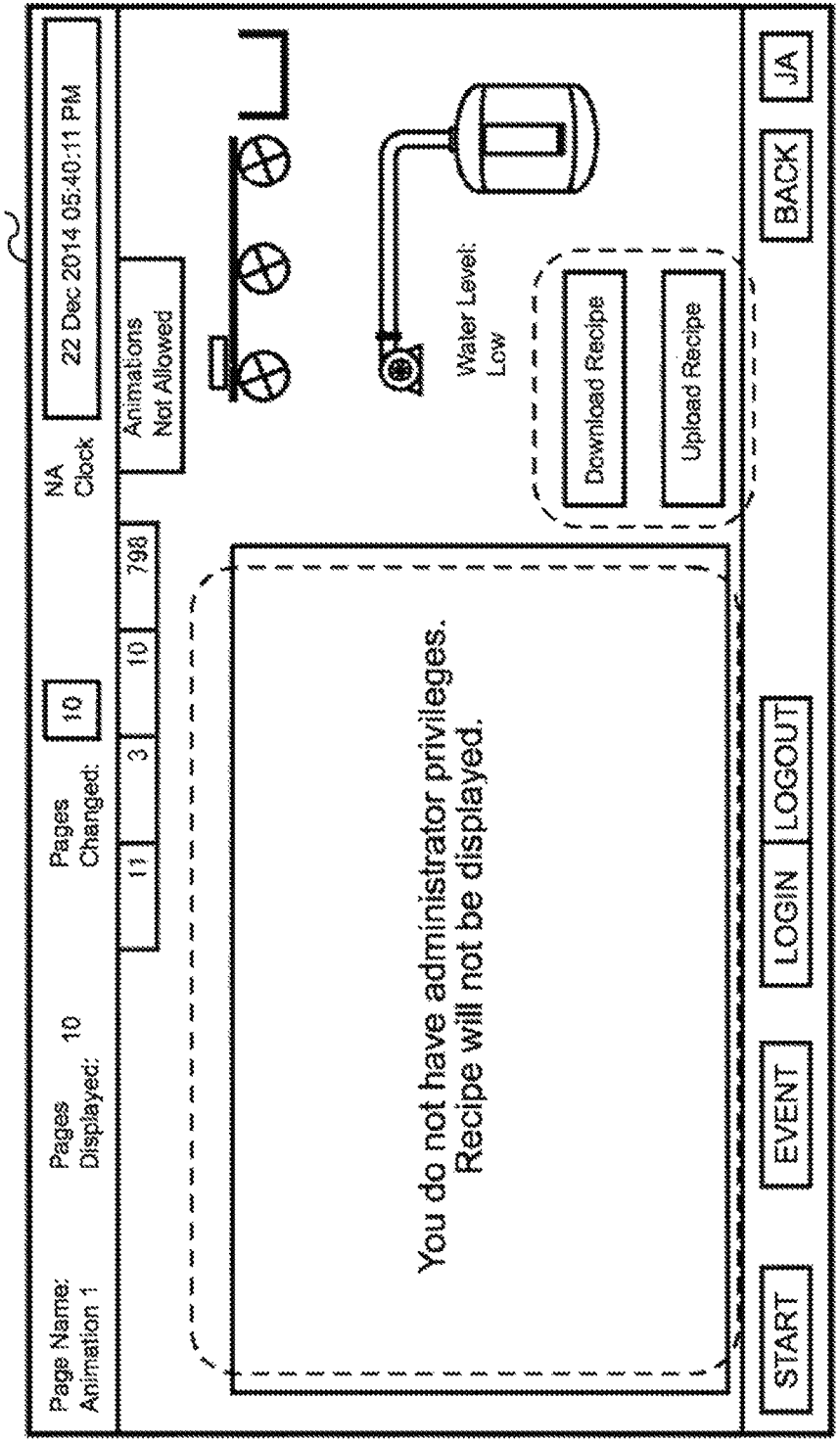

FIGS. 4A and 4B illustrate an example of the contents displayed on an HMI screen presented by the display 100 according to an embodiment. FIG. 4A presented display example of an HMI screen for a user having administrator privileges; FIG. 4B present a display example of an HMI screen for user having no administrator privileges.

More specifically, the HMI screen illustrated in FIGS. 4A and 4B is related to a food-processing device. The HMI screen for a user having administrator privileges (FIG. 4A) displays a recipe 141 needed for operating the food processing device, and a button 142 for downloading or uploading the recipe 141. In contrast, the recipe 141 and the button 142 are unavailable in the HMI screen for a user having no administrator privileges (FIG. 4B).

In the example of the HMI screen presented in FIGS. 4A and 4B, the HMI screen is designed so that non-administrator users cannot manipulate any functions related to the recipe. In this manner, the display 100 according to the embodiment can change whether or not to display or to make a control component available for each control component placed on the HMI screen in accordance with the privileges of the user.

Figure 5:
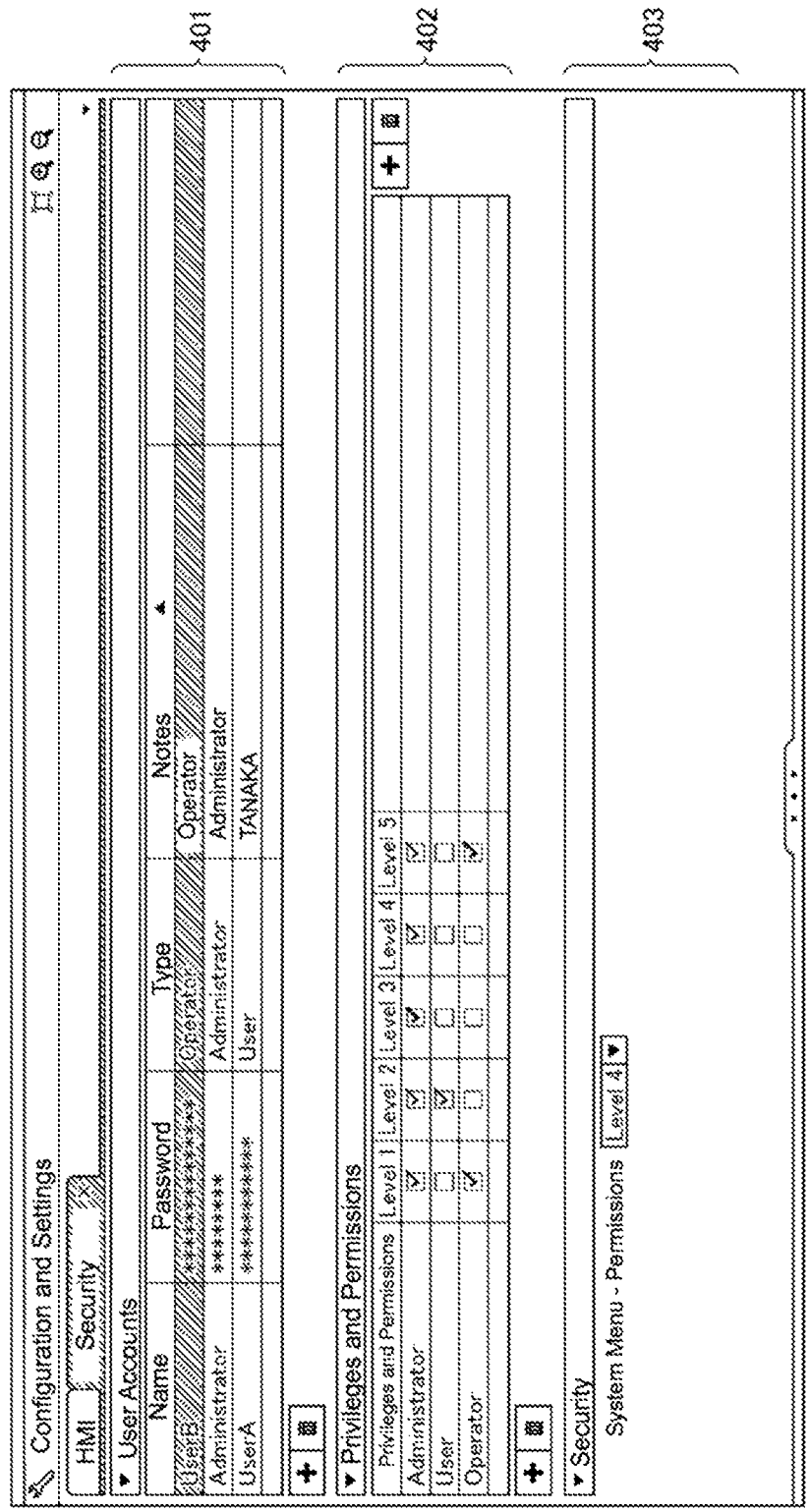
FIG. 5 illustrates an example of a development program used to design an HMI screen presented by the programmable display according to an embodiment.
Figure 6:
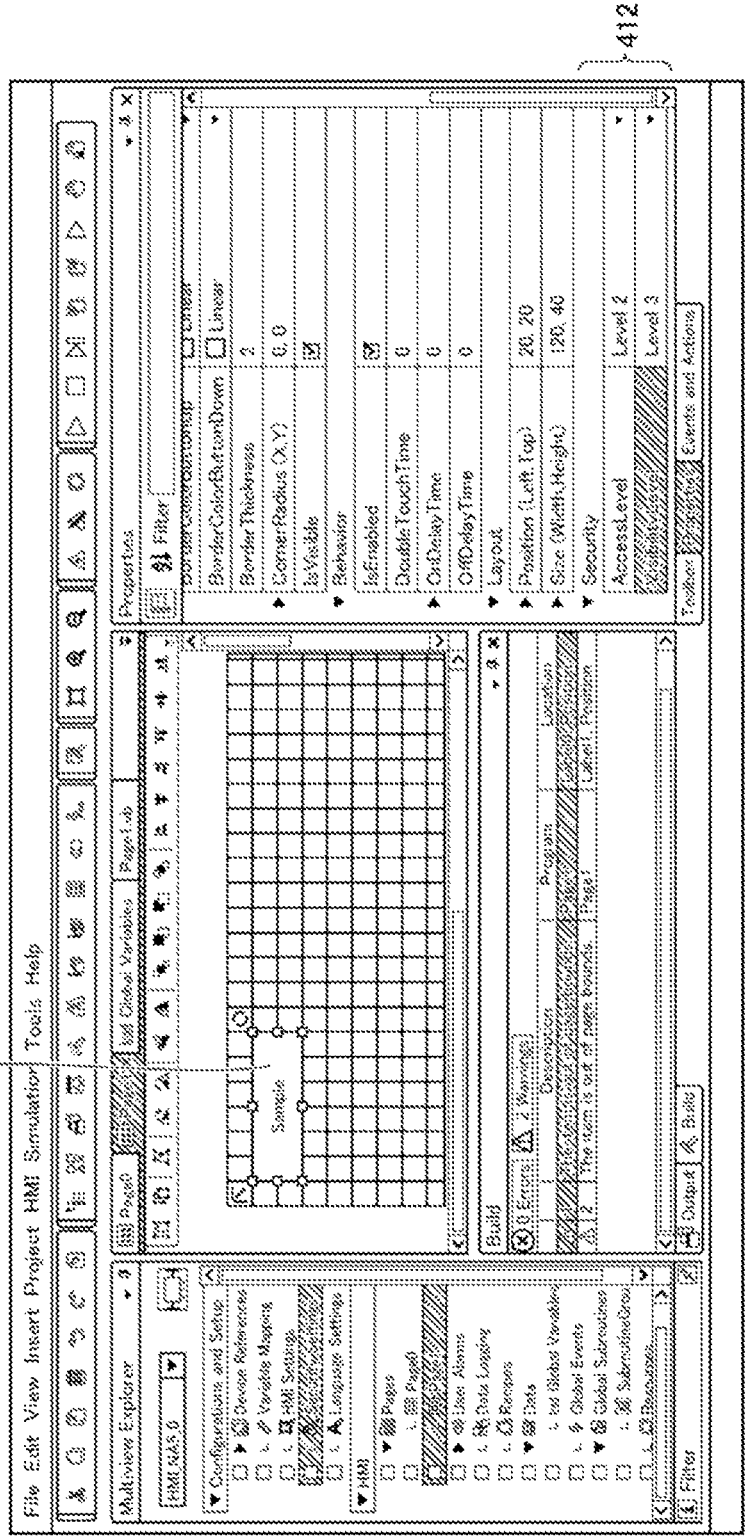
FIG. 6 illustrates an example of a development program used to design an HMI screen presented by the programmable display according to an embodiment.

FIG. 5 and FIG. 6 illustrate examples of a development program used to design an HMI screen presented by the display 100 according to an embodiment. FIG. 5 depicts a security settings screen 400, and FIG. 6 depicts an HMI screen design screen 410. The details of a user account may be setup from a dialog 401 on the security settings screen 400 depicted in FIG. 5. Namely, the name for each user, password, the privileges, comments and the like may be entered in the dialog 401. The particulars regarding permissions may be entered in accordance with each privilege in a dialog 402. That is, for each privilege created in the dialog 401, an allowable level of access (permissions) may be set up in the dialog 402. In the security settings screen 400, a "permission" signifies a type of attribute like a group; permissions are set for each HMI screen or each control component. Thus, the content of the HMI screen or control component is displayed to only the user having the permissions provided by these settings. For instance, in the dialog 403, "Level 4" is set as the permission for a "system menu", and in dialog 402 only a user possessing Administrator (admin) privileges are assigned the permission "Level 4". With the privileges established in this manner, only a user with administrator privileges is shown a "system menu".

Additionally, a security level is established for each desired control component included in an HMI screen the design screen 410 illustrated in FIG. 6. In the example illustrated in FIG. 6, the security level is said in a dialog 412 for a control component 411. In the example illustrated in FIG. 6, a visibility level for the control component 411 is set to Level 3; therefore, the user that will be displayed the control component 411 is the user assigned an attribute of Level 3 in the security settings screen 400 illustrated in FIG. 5; in other words, the display of the control component is limited to a user having the privileges of an Administrator (admin).

As above described, the security level setting function in the display 100 according to the embodiment can control the HMI screen in accordance with the privileges each user possesses.

F. OVERVIEW

The display 100 according to the embodiment deals with novel security issues that arise when the above-described remote viewing and operation function, and the security level setting function are combined. In other words, the display 100 provides a novel function that appropriately preserves the security level of the contents displayed.

More specifically, the display 100 prohibits simultaneous logins (access) to the display 100 from a plurality of users each having different privileges assigned thereto. For instance, it is possible to restrict or ban simultaneous access to the display 100 from a user having administrator privileges (admin) and a user with no administrator privileges (normal user) with the above-described privilege settings [function].

Figure 7A:
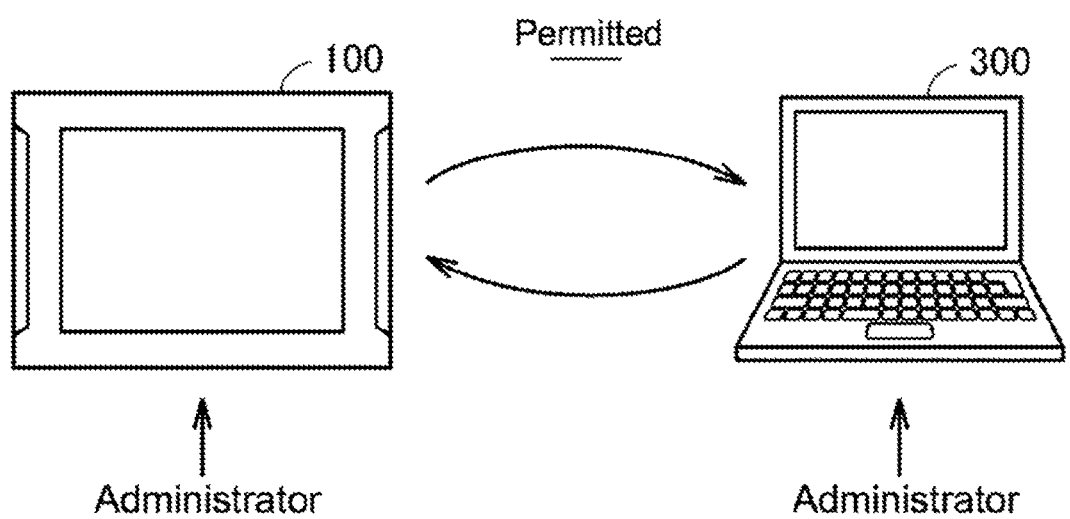
FIGS. 7A, 7B, 7C are schematic views for describing a function for appropriately maintaining the security level provided by a programmable display according to an embodiment.
Figure 7B:
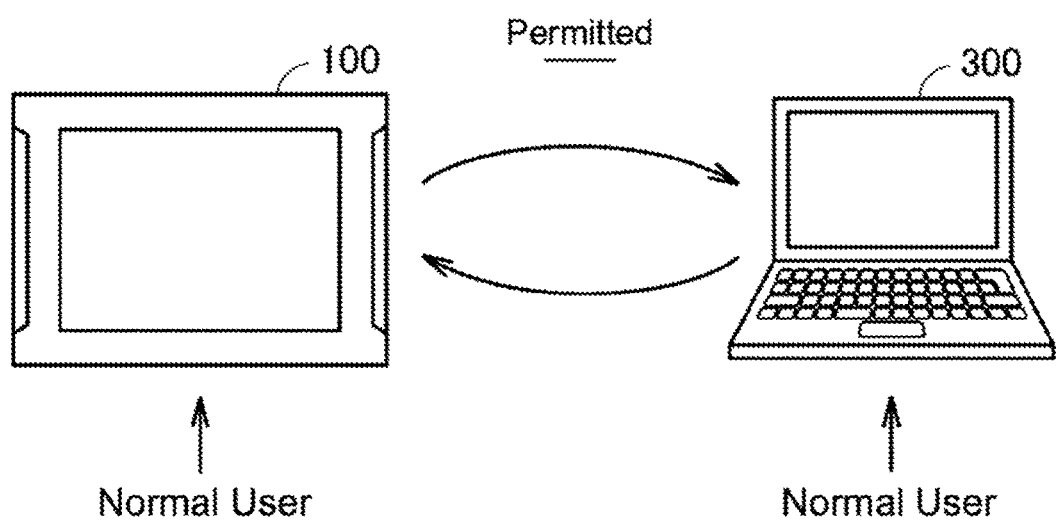
Figure 7C:
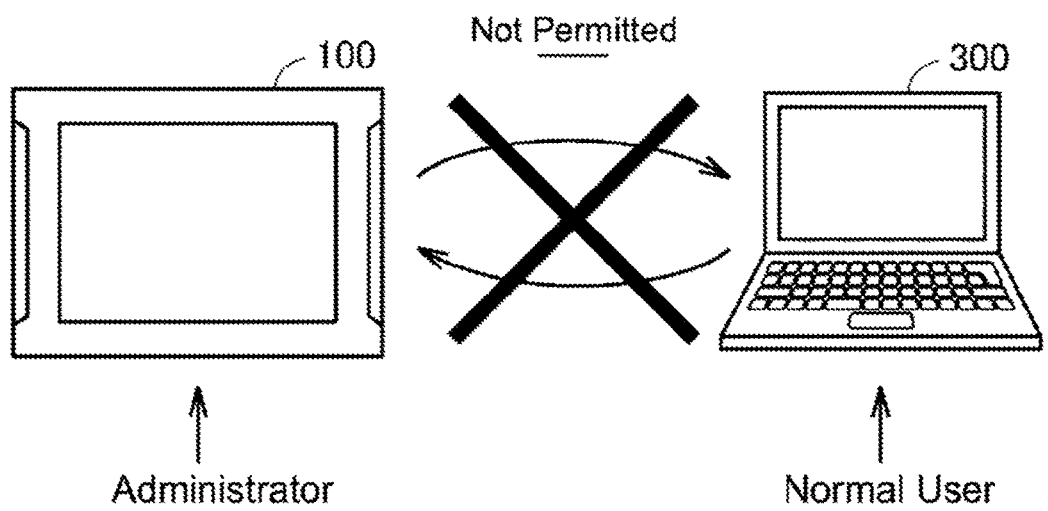

FIGS. 7A, 7B, 7C are schematic views for describing a function for appropriately maintaining the security level provided by a display 100 according to the embodiment. FIGS. 7A, 7B, 7C depict the client device 300 connecting to the display 100. As illustrated in FIG. 7A, an administrator HMI screen can be displayed when a user having administrator privileges is logged in from both the display 100 and the client device 300. As illustrated in FIG. 7B, a normal-user HMI screen can be displayed on the display 100 and the client device 300 when a user having no administrator privileges (normal user) is using both the display 100 and the client device 300.

While there are no security problems regarding either FIG. 7A or FIG. 7B, the issue arises in the kind of case depicted in FIG. 7C. Namely, when a user having administrator privileges is logged into the display 100 while a user having no administrator privileges (normal user) is logged using the client device 300, the administrator HMI screen is provided to the normal user.

Therefore, when the situation illustrated in FIG. 7C arises, the display 100 restricts or prohibits usage thereof by one user to maintain the security that was established. Generally, more important information is contained in the administrator HMI screen, and therefore the user having administrator privileges is logged out of the display 100 when the situation in FIG. 7C arises. Hereby, the normal-user HMI screen may be displayed on both the display 100 and the client device 300.

G. FUNCTIONAL CONFIGURATION OF DISPLAY 100

Figure 8:
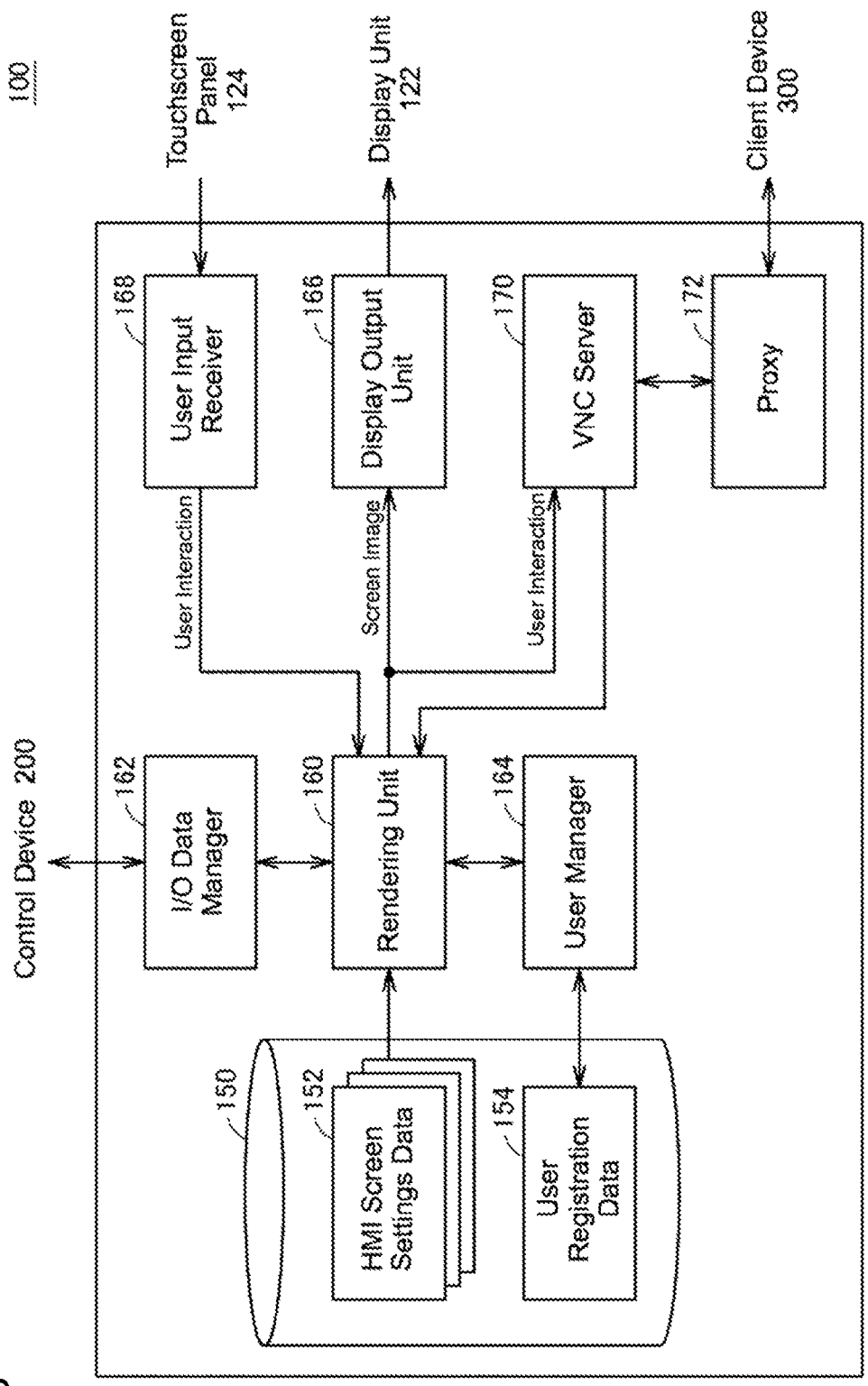
FIG. 8 is a block diagram illustrating a functional configuration in a programmable display according to an embodiment.

Next, the functional configuration of the display 100 is described. FIG. 8 is a block diagram illustrating a functional configuration in the display 100 according to an embodiment. Referring to FIG. 8, the display 100 contains a data storage unit 150, a rendering unit 160, an I/O data manager 162, user manager 164, display output unit 166, a user input receiver 168, a VNC server 170, and a proxy 172 as part of the functional configuration.

The data storage unit 150 stores data needed to display the HMI screen on the display 100. In concrete terms, the data storage unit 150 contains HMI screen settings data 152, and user registration data 154.

The HMI screen settings data 152 is information for displaying the HMI screen, and may be designed using the kind of design screen depicted in FIG. 6. The user registration data 154 contains information on the user accounts allowed to log into the display 100. The user registration data 154 can be created using the kind of security settings screen 400 illustrated in FIG. 5.

The user manager 164 includes a user manager function that identifies the user accessing the display 100 and processes the user log in. The user manager 164 also executes the processing that preserves the security level as described above for FIG. 7. That is, the user manager 164 prohibits simultaneous access to the display 100 by a plurality of users each having different privileges assigned. The processing that prohibits this simultaneous access is described below in detail.

The rendering unit 160 reads the HMI screen settings data 152 contained in the data storage unit 150, and generates a screen image that is presented as the HMI screen. More specifically, the rendering unit 160 dynamically generates the HMI screen to reflect the field signals exchanged with the control device 200 via the I/O data manager 162. In addition, the rendering unit 160 acquires the privilege information for a user currently logged in from the user manager 164. The rendering unit 160 determines for each control component defined in the HMI screen settings data 152 whether or not to display or make a control component available based on the permissions assigned thereto, and reflects these permissions on HMI screen. In other words, the rendering unit 160 generates an HMI screen (interface screen) containing information from the control device 200 in accordance with the privileges assigned to a user identified by the user manager 164 (user management unit).

The I/O data manager 162 mediates the exchange of field signals between the rendering unit 160 and the control device 200.

The display output unit 166 outputs the screen image generated by the rendering unit 160 on the display unit 122. The display unit 122 thus outputs the HMI screen (the interface screen).

The user input receiver 168 the detects input the user enters on the touchscreen panel 124, and outputs the detection results as user input to the rendering unit 160.

The VNC server 170 provides the client device 300 with the screen image generated by the rendering unit 160, and accepts inputs interaction from the client device 300. The proxy 172 provides a relay function that mediates the exchange of data between the VNC server 170 and the client device 300. More specifically, the proxy 172 establishes a session between one or a plurality of client devices 300, and manages the communications with each of the client devices 300. At this point, the proxy 172 establishes a session based on the results of identifying a user carried out in the user manager 164. In other words, the VNC server 170 and the proxy 172 establish a connection with a client device 300 based on the results of the user manager 164 identifying a user in response to a request for access from a user on an external device, e.g., the client device 300. The VNC server 170 and the proxy also manage the connection that transmits an HMI screen (interface screen) to the client device 300 with which a connection is established.

Note that the functional configuration illustrated in FIG. 8 is merely one example, and the more appropriate modules may be adapted when implementing these functions; moreover, a portion of those functions may be implemented outside of the display 100. Typically, a portion of the functions illustrated in FIG. 8 maybe implemented in a server device (cloud system) or a desired local server connected to the display 100 via a network.

H. PROCESSING EXAMPLES

Examples of the processing provided in the display 100 according to an embodiment are described below. In the explanation that follows, for simplicity the processing example is described on the basis of requiring a predetermined authentication process for only a user having administrator privileges (admin), and not requiring any kind of authentication process for a user having no administrator privileges (normal user). An administrator may login via input entered on the display 100 itself (console input), or additionally, via input through a client device 300.

Additionally, access from the client device 300 to the display 100 is implemented through VNC, and is therefore referred to as a "VNC connection" below.

H-1: First Processing Example

In the first processing example, the HMI screen is presented on one page. The following explanation assumes that an administrator is previously logged into the display 100. FIG. 9A through FIG. 12B are schematic views for describing the first example of the processing performed in a display 100 according to an embodiment.

FIGS. 9A, 9B, 9C, and 9D illustrate a processing example where a normal user accesses the display 100 through a client device 300 while an administrator is logged into the display 100.

As illustrated in FIG. 9A while a certain user is logged into the display 100 with administrator privileges, the normal user attempts a VNC connection. Note that in the case depicted in FIG. 9A the display 100 presents an administrator HMI screen 180.

Figure 9B:
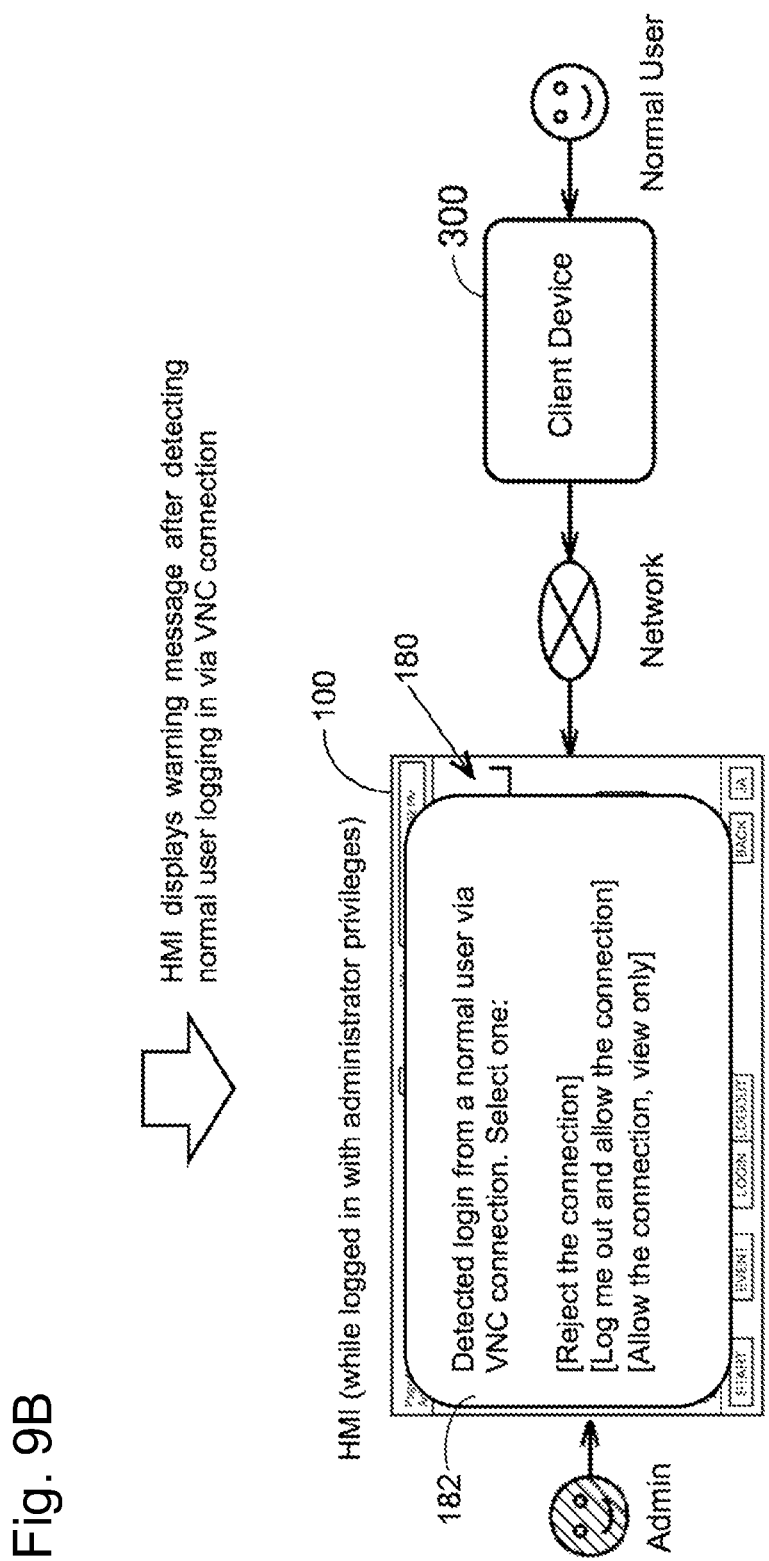
Figure 9C:
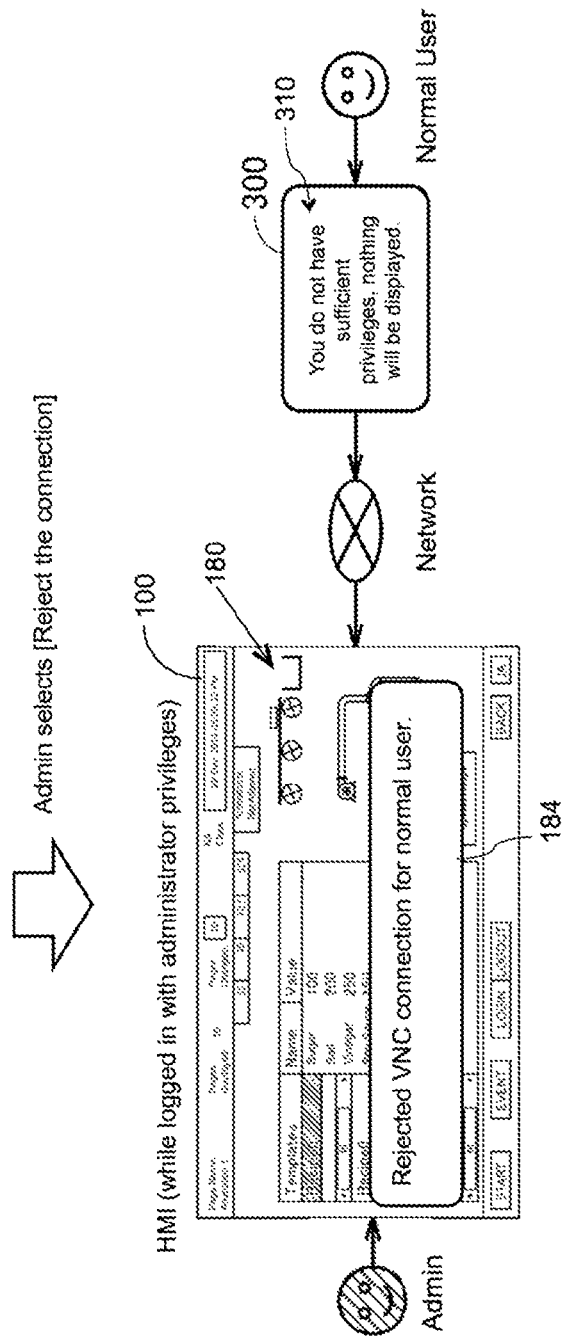

On detecting a VNC connection with normal user privileges, the display 100 presents a warning message 182 on the HMI screen 180 as illustrated in FIG. 9B. The warning message 182 notifies of you are a viewer that a VNC connection request was made by a normal user, and presents a list of selectable actions to deal with the VNC connection from the normal user. That is, the user management function in the display 100 notifies an administrator (first user) assigned administrator privileges (a first privilege) of a normal user (second user) assigned normal user privileges (a second privilege) that is lower than the administrator privileges attempting to access the display 100 when the normal user attempts to access the display while the administrator is accessing the display 100.

When an administrator selects "Reject the connection" in the warning message 182 displayed in FIG. 9B, the request for VNC connection from the normal user is rejected. Namely, the display 100 does not permit the normal user to access the display 100 in response to an instruction from the administrator.

At this point, the display 100 provides an alert message 310 to the client device 300 (normal user) making the VNC connection request. At the same time, the display 100 provides notification in an alert message 184 on its own display unit 122 that the VNC connection requested the normal user was rejected.

Figure 9D:
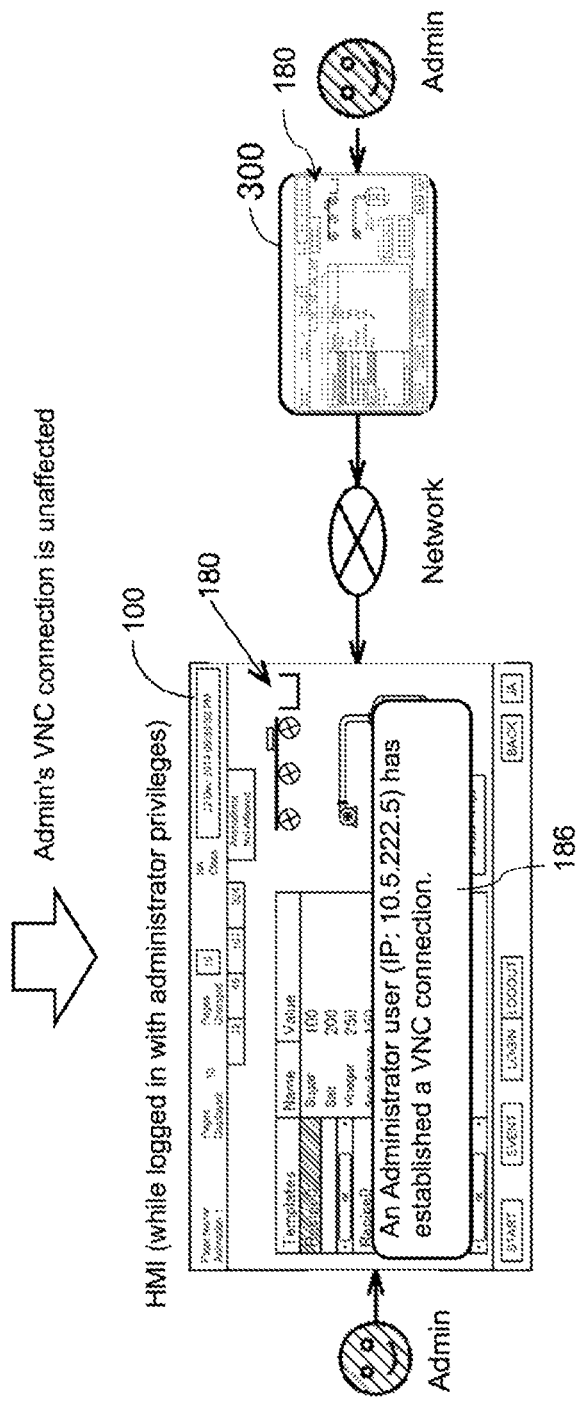

In contrast, as illustrated in FIG. 9D, VNC connection from a user having administrator privileges is permitted because the privileges are the same as the user that is previously logged in. In other words, simultaneous logins into the display 100 by an administrator are possible via the console and via the client device 300. Note that when an administrator establishes a new VNC connection, the display 100 presents an event message 186 on the display unit 122 itself to provide notification that an administrator established a VNC connection. An administrator HMI screen 180 can be presented to the client device 300 (admin) with which the VNC connection was established via the VNC connection.

Once a VNC connection from an administrator an administrator is terminated an event message may be presented to provide notification that the VNC connection was terminated.

Figure 10A:
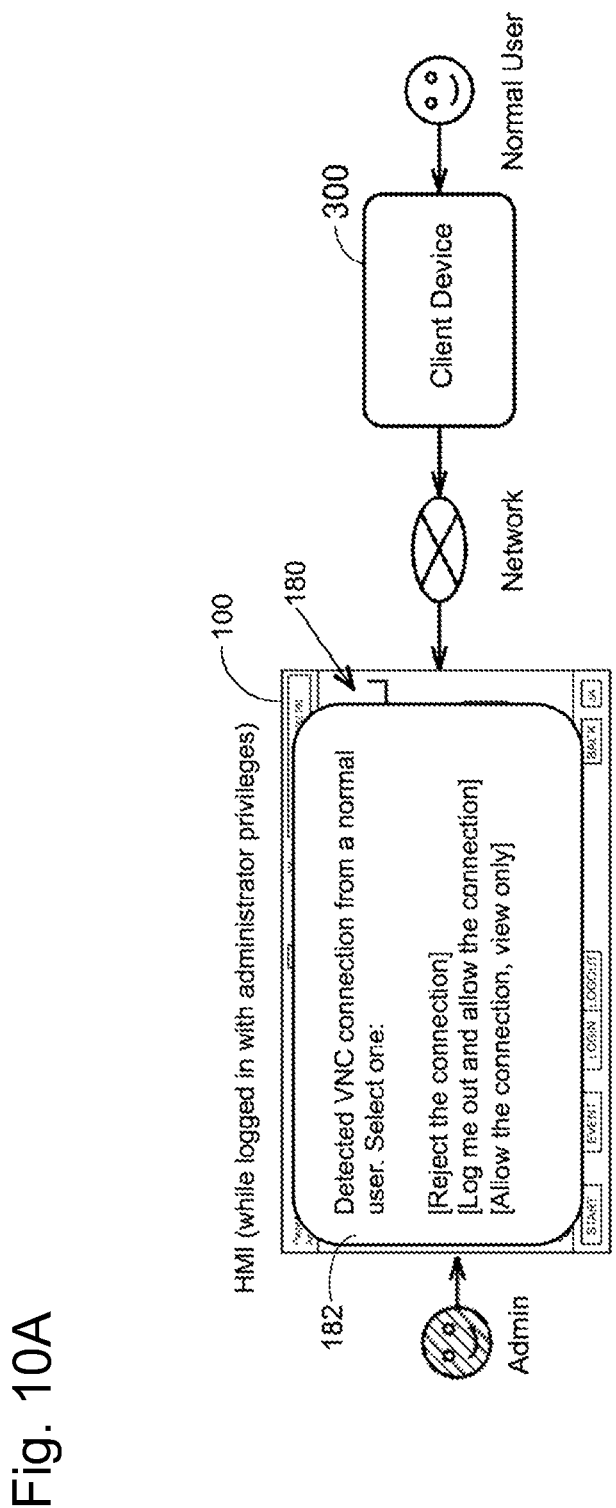
FIGS. 10A, 10B, and 10C are schematic views for describing the first example of the processing performed in a programmable display according to an embodiment.
Figure 10B:
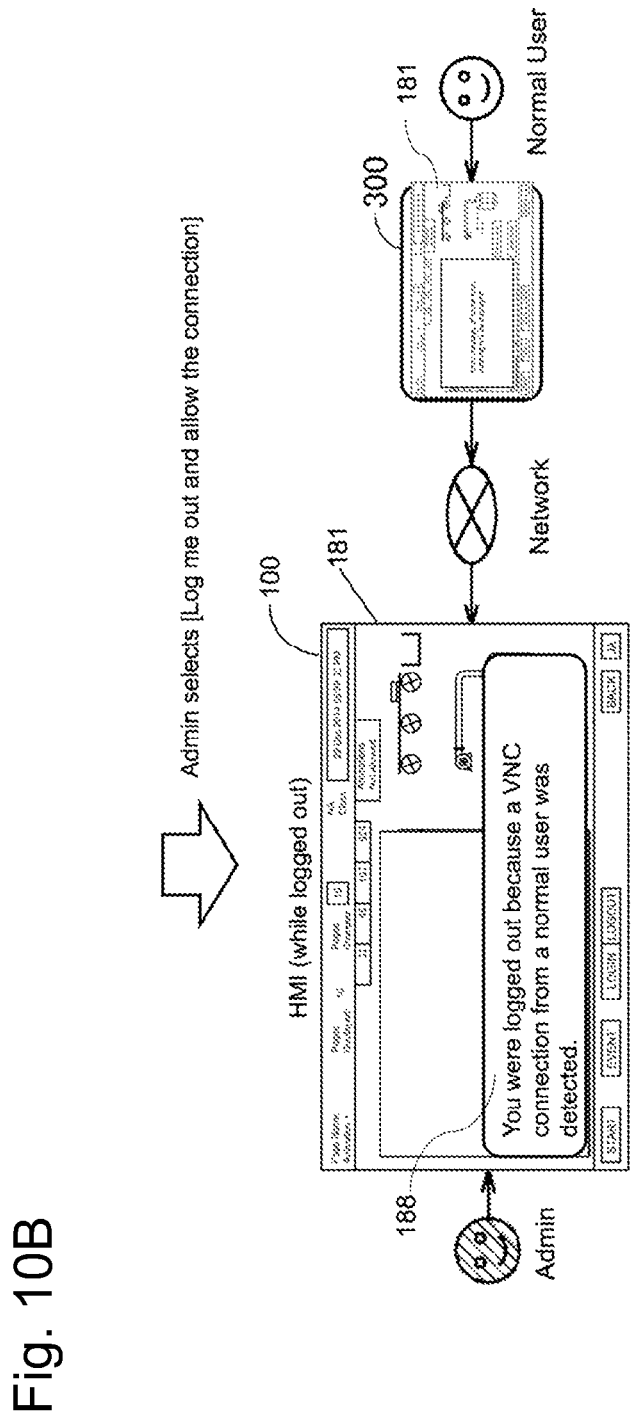
Figure 10C:
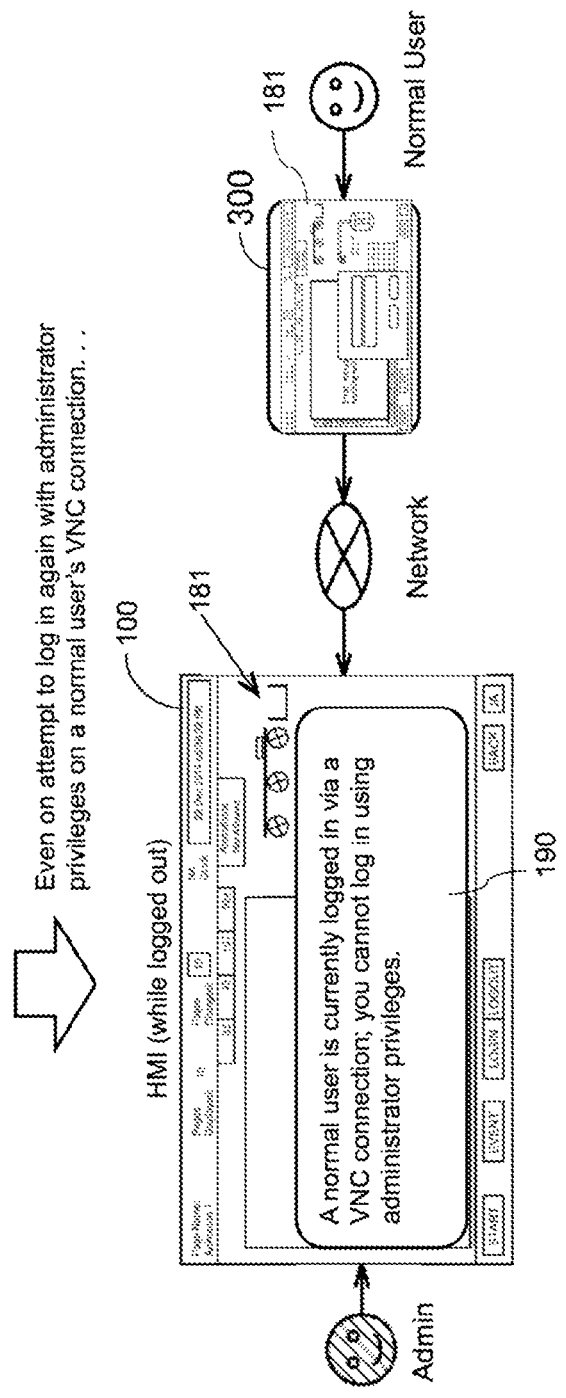

FIGS. 10A, 10B, and 10C illustrate the processing that takes place when in the above-mentioned processing the administrator selects "Log me out and allow the connection" from the warning message 182 shown in FIG. 9B. On detecting a VNC connection with normal user privileges, the display 100 presents a warning message 182 on the HMI screen 180 as illustrated in FIG. 10A. In the administrator selects "Log me out and allow the connection" from the warning message 182 displayed in FIG. 10A, the administrator is logged out and the VNC connection from the normal user becomes possible as illustrated in FIG. 10B. Namely, the display 100 terminates the access to the display 100 as an administrator in response to an instruction from the administrator.

In this manner, the user management function in the display 100 terminates access to the display 100 as an administrator (first user) assigned administrator privileges (a first privilege) when a normal user (second user) assigned normal user privileges (a second privilege) that is lower than the administrator privileges attempts to access the display 100 while the administrator assigned the administrator privilege is accessing the display 100.

At this point the user logged in with administrator privileges is now accessing the display 100 as a normal user. In other words, a normal user is now accessing the display 100 from both the display 100 and the client device 300. At this point, the display 100 presents an alert message 188 on its own it display unit 122 indicating that the user logged in as an administrator has been logged out in order to permit the VNC connection from a normal user.

After logging out the admin, the display 100 in the client device 300 each display a normal user HMI screen 181. That is, in the state illustrated in FIG. 10B, the extent to which the HMI screen may be viewed or manipulated is limited to within the privileges assigned to a normal user. In the example of HMI screen illustrated in FIGS. 4A and 4B, for instance the state where the normal user is not able to display or download or upload a recipe is preserved. In this manner, placing limitations on the HMI screen displayed ensures this kind of information remains secure against access from the client device 300.

Given that a normal user is accessing the display 100 from the display 100 and the client device 300 in the case illustrated in FIG. 10B, the display 100 may be configured so that a user having administrator privileges cannot log in with the administrator privileges. That is, as illustrated in FIG. 10C an administrator that is temporarily logged out cannot log in with administrator privileges while there is a VNC connection for a normal user. The login is rejected even if the administrator performs the login procedure. In this case, the display 100 provides a warning message 190 on the HMI screen 181 detailing why the login cannot be completed.

However, the display 100 may be configured to prioritize a login from an administrator relative to access from a normal user. That is, the display 100 may be configured to block access from the normal user if a login from an administrator is successful while the normal user is on the VNC connection.

On one hand, the administrator may login if the VNC connection for the normal user is terminated, or is disconnected as illustrated in FIG. 11A. Namely, if there is no VNC connection from a normal user the administrator may login. FIG. 11B illustrates when an administrator has logged in again, and in this case the display 100 presents the administrator HMI screen 180.

Figure 11C:
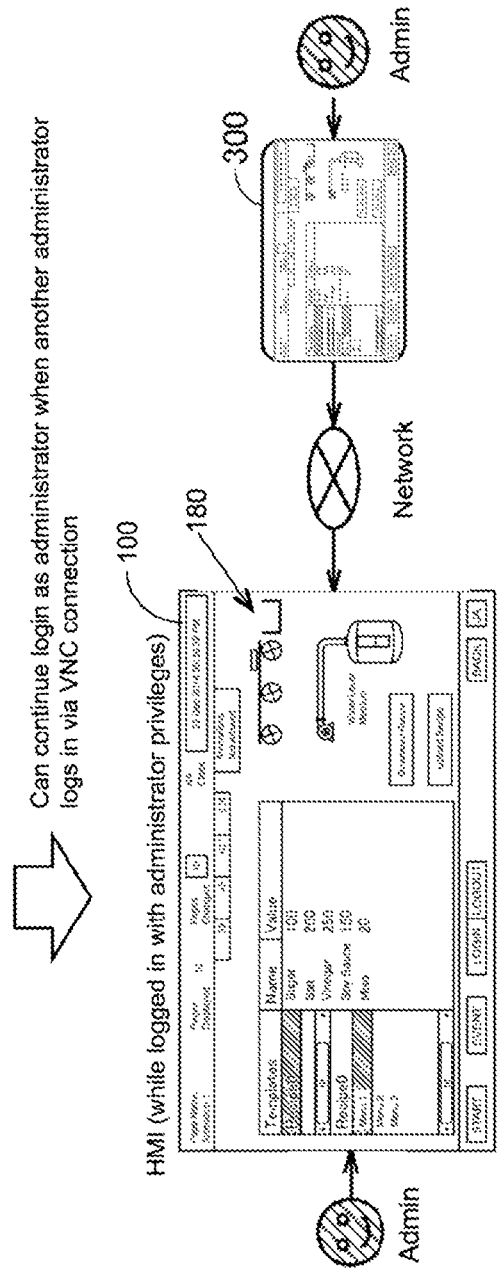

Note that as illustrated in FIG. 11C, if another administrator has created a VNC connection, logging into the display 100 as an administrator is possible. Alternatively, access to the display 100 via a VNC connection from a user having administrator privileges is permitted when an administrator is logged into the display 100. In this case, the administrator HMI screen 180 is presented on the display 100 and the client device 300 respectively.

The above FIG. 10A illustrates when an administrator is logged into the display 100; in this case, a normal user may create a VNC connection remote viewing or operation are not permitted. Therefore, when the display 100 receives a request for a VNC connection from a normal user, the user logged in with administrator privileges is presented a warning message 182. For instance, when a normal user needs to perform remote maintenance or remote operations, the administrator may log out voluntarily. If the warning message 182 is not provided, the administrator logged into the display 100 will remain unaware of the normal user's request for a VNC connection, creating a bug where the normal user can never access the display 100. Therefore, the warning message 182 is preferably presented when there is a request for a VNC connection from a normal user to alert the administrator of the situation.

Figure 12A:
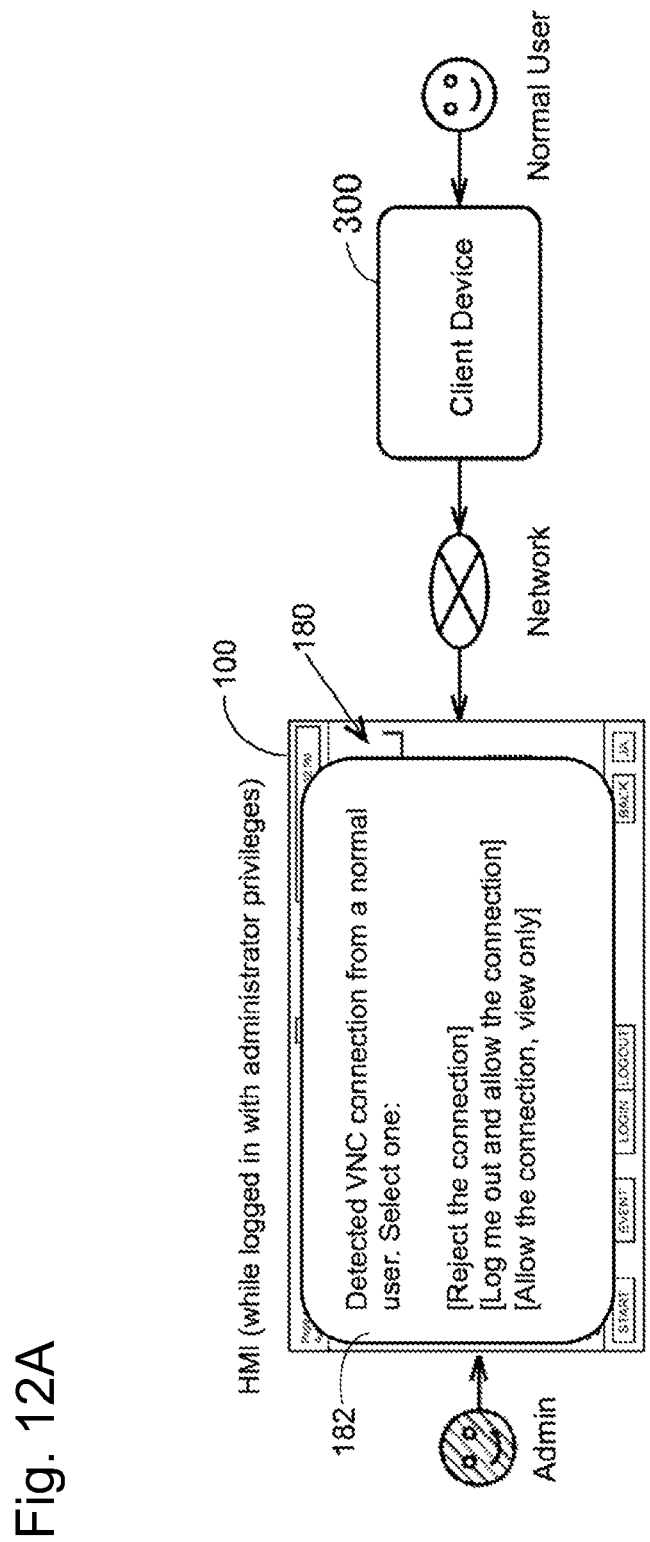
FIGS. 12A, 12B are schematic views for describing the first example of the processing performed in a programmable display according to an embodiment.
Figure 12B:
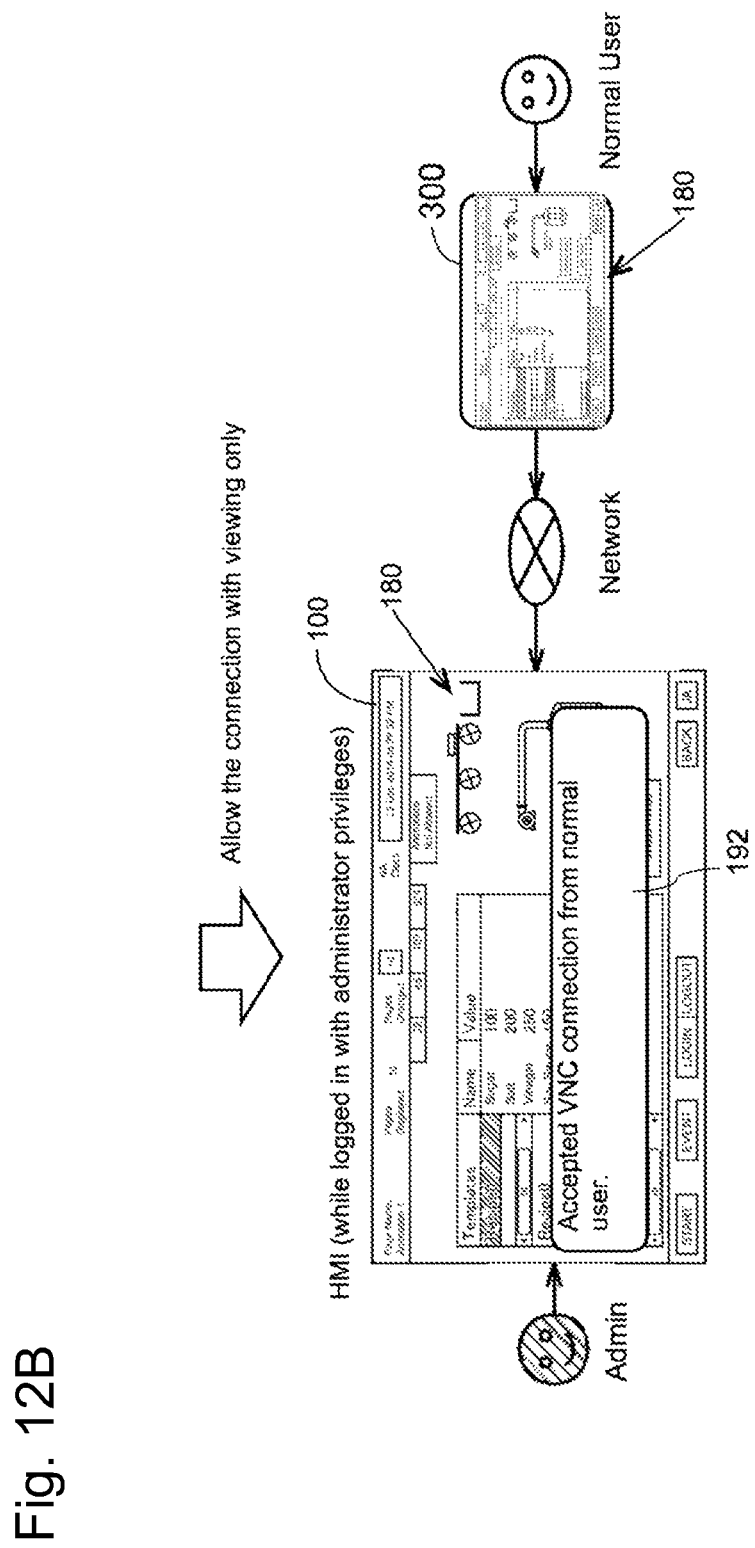

FIGS. 12A and 12B illustrate the processing that takes place when the administrator selects "Allow the connection, view only" from the warning message 182 shown in FIG. 9B. On detecting a VNC connection with normal user privileges, the display 100 presents a warning message 182 on the HMI screen 180 as illustrated in FIG. 12A. When the administrator selects "Allow the connection, view only" from the warning message 182 shown in FIG. 12A, access to the display 100 from the normal user is permitted as illustrated in FIG. 12B and the administrator HMI screen 180 presented on the display 100 is also presented on the client device 300. However, the administrator HMI screen 180 is preferably only available to the normal user for viewing, and interactions therewith are preferably prohibited. That is, the display 100 permits the normal user access to the HMI screen 180 (interface screen) with greater limitations than the limitations on the administrator in response to an instruction from the administrator.

In the configuration example illustrated in FIG. 12B, while the normal user is permitted to view the HMI screen 180, the user cannot perform any interactions with the screen. Therefore, this configuration is preferably applied when needing to permit remote maintenance of, but prohibit remote operations on the control device 200.

As illustrated in FIG. 12B, when access from the normal user is permitted, the display 100 presents a warning message 192 to that effect on its on the display unit 122.

As above described, the embodiment manages the login and controls the content displayed on an HMI screen in accordance with the privileges of the user using the display 100 and one or more client devices 300 respectively to thereby realize the appropriate security level. To summarize, the embodiment realizes the security level required by combining the procedure for limiting the VNC connection from a normal user while a user with administrator privileges is logged in, and the procedure for causing the administrator to logout depending on the status of the VNC connection from the client device 300.

Although the administrator is given three selectable options in the implementation of the warning message 182 (FIGS. 9B, 10A, and 12A) in the above-described processing example, all the options presented in the example need not be implemented. It is sufficient to have at least one option that may be executed in accordance with the policies of the operator of the control system 1.

Furthermore, although in the above-described processing example the administrator made an explicit selection to execute log out processing, this kind of processing where a user makes an explicit selection may be omitted. Instead, the administrator may be automatically logged out after the VNC connection from the normal user is detected.

As illustrated in FIGS. 10A, 10B, and 10C, when a user with fewer privileges attempts remote access (VNC connection), the administrator is logged out to return the display 100 to a secure state. Adopting this technique prevents an administrator from unknowingly leaking information to a client device 300 logged on via a VNC connection, and prevents erroneous operations through the wrong input to the display.

As described in the first processing example, the display 100 according to the embodiment the user management function restricts a normal user (second user) assigned normal user privileges (a second privilege) lower than the administrator privileges (a first privilege) from access to an HMI screen (interface screen) generated for an administrator (a first user) assigned the administrator privileges (first privilege).

Figure 13:
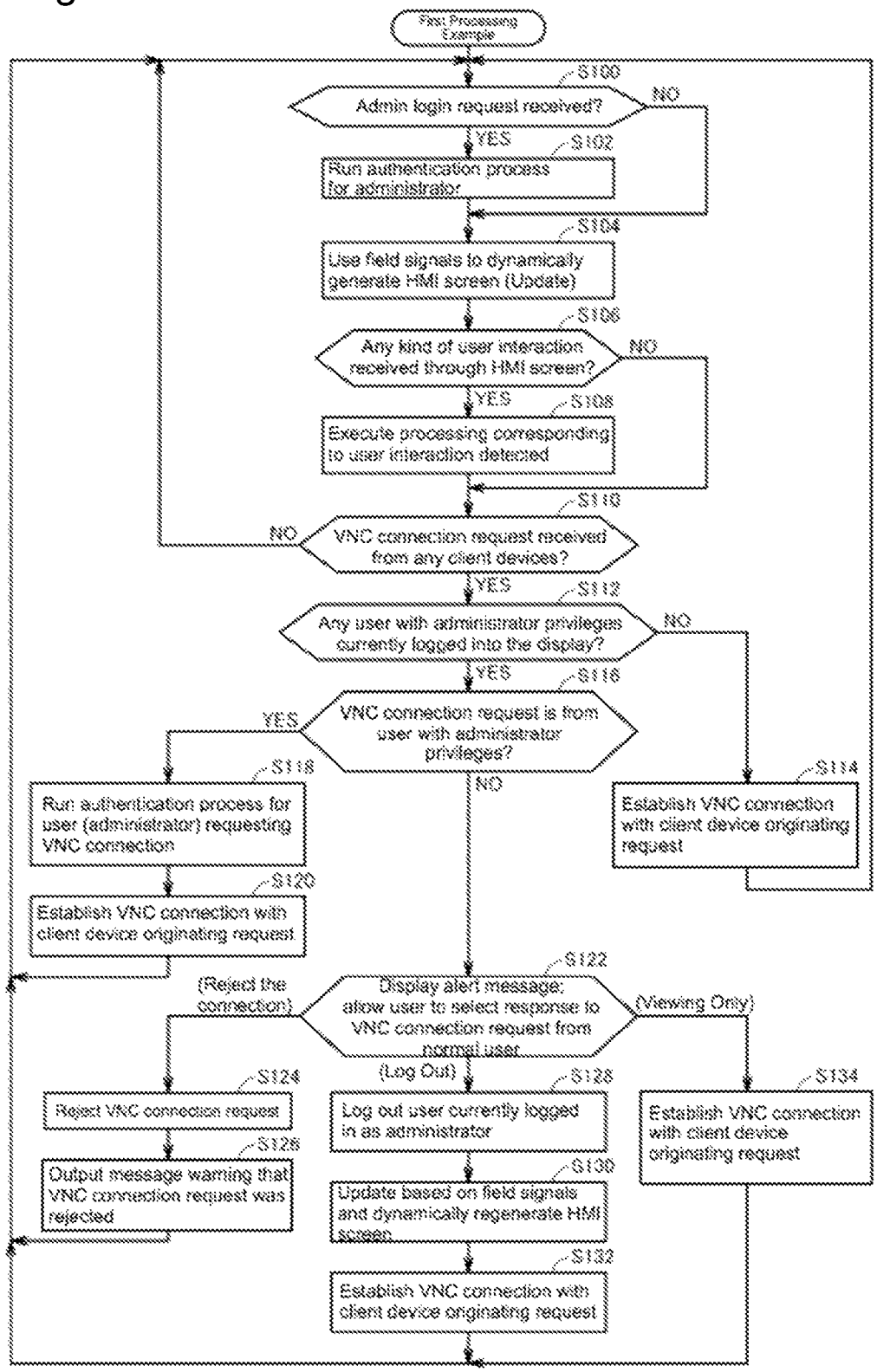
FIG. 13 is a flowchart for describing the processing procedure in the first processing example in a programmable display according to an embodiment.

Next, the procedures for implementing the above first processing example are described. FIG. 13 is a flowchart for describing the processing procedure in the first processing example in a display 100 according to an embodiment. Each of the steps illustrated in FIG. 13 are realized by running a program on the processor 102 in the display 100.

The processor 102 in the display 100 determines whether or not a request for login was received from an administrator. When a request for administrator login is received (YES, in step S100), the processor 102 executes an authentication process for the administrator (step S102).

When no request for administrator login is received (NO, at step S100), or after executing step S102, the processor 102 dynamically generates (or updates) an HMI screen to reflect the field signals exchanged with the control device 200 (step S104). The processor 102 changes the content displayed in accordance with the privileges of the user operating the display 100 (i.e., in accordance with whether or not an administrator is logged in).

The processor 102 determines whether or not there was some user interaction with the HMI screen (step S106). When there is some kind of user interaction with respect to the HMI screen (YES, at step S106), the processor 102 executes processing corresponding to the user interaction detected (step S108). Typically, a process is executed that outputs some kind of internal command to the control device 200.

The processor 102 then determines whether or not a request for VNC connection was received from any client devices 300 (step S110). When no requests for a VNC connection are received from any client devices 300 (NO, at step S110), processing is repeated from step S100.

In contrast, when a request for a VNC connection is received from any of the client devices 300 (YES, step S110), the processor 102 determines whether or not a user having administrator privileges is currently logged into the display 100 (step S112). When a user having administrator privileges is not currently logged in to the display 100 (NO, step S112), the processor 102 establishes a VNC connection between the display 100 and the client device 300 originating the request for the VNC connection (step S114). Processing then repeats from step S100. Note that when a VNC connection is established, the screen image generated is presented on the display 100 as well as the client device 300 with the established VNC connection.

When a user having administrator privileges is currently logged into the display 100 (YES, at step S112), the processor 102 determines whether or not the user requesting the VNC connection has administrator privileges (step S116). When the request for a VNC connection is made by user having administrator privileges (YES, at step S116), the processor 102 runs in authentication process with respect to the user requesting the VNC connection (step S118). When the authentication process completes successfully, the processor 102 establishes a VNC connection between the client device 300 originating the request for the VNC connection and the display 100 (step S120). Processing then repeats from step S100. Note that when a VNC connection is established, the screen image generated is presented on the display 100 as well as the client device 300 with the established VNC connection.

When the request for a VNC connection is made by user having no administrator privileges, i.e., a normal user (NO, at step S116), the processor 102 presents a warning message 192 (e.g., FIG. 9B) so that a selection can be made to deal with the request from the normal user for the VNC connection (step S122).

When the user presented with the warning message 192 selects "Reject the connection" ("Reject the connection" from step S122), the processor 102 rejects the request for the VNC connection, sends the client device 300 requesting the VNC connection an alert message and outputs an alert message to the display unit 122 indicating that the VNC connection was rejected (step S126). Processing then repeats from step S100.

On the other hand, when the user presented with the warning message 192 selects "Log me out and allow the connection" ("Logout" at stem S122), the processor 102 logs out the user (administrator) that is currently logged in (step S128), and regenerates the HMI screen dynamically to reflect the field signals exchanged between the display 100 and the control device 200 (step S130). The processor 102 then establishes a VNC connection between the client device 300 originating the request for the VNC connection and the display 100 (step S132). Processing then repeats from step S100. When a VNC connection is established, the screen image generated is presented on the display 100 as well as on the client device 300 with the established VNC connection.

In contrast, when the user presented with the warning message 192 selects "Allow the connection, view only" ("View only" at step S122), the processor 102 establishes a one-way VNC connection with the client device 300 originating the request for a VNC connection (step S134). On a one-way VNC connection means that while the screen image generated for providing the HMI screen is sent from the display 100 to the connected client device 300, the user interaction the client device 300 receives from the user is not sent to the display 100. Processing then repeats from step S100.

H-2: Second Processing Example

Next, a processing example where multiple pages of the HMI screen are presented is described. The display 100 according to the embodiment is capable of setting the accessibility of pages on a user account basis. Even in this case where the user that may access each page differs, adopting the following steps ensure the information remains secure.

Figure 14:
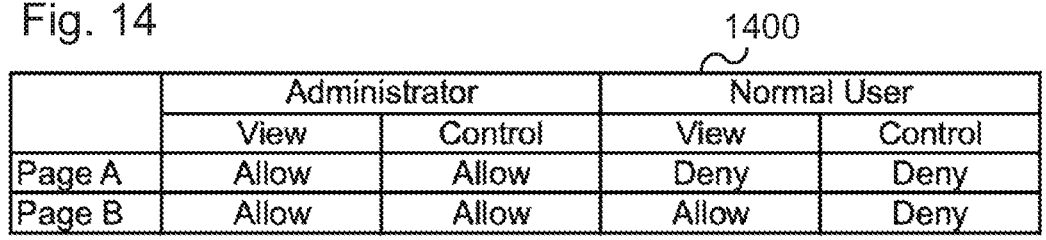
FIG. 14 illustrates an example of setting the permissions for an HMI screen in a programmable display according to an embodiment.

FIG. 14 illustrates a table 1400 showing an example of setting the permissions for an HMI screen in a display 100 according to the embodiment. Referring to FIG. 14, the HMI screen is assumed to have two pages: Page A and Page B. For instance, an administrator may be allowed to view and interact with Page A and Page B. In contrast, a normal user may be prevented from viewing and interacting with Page A, while being allowed to only view Page B.

Figure 15B:
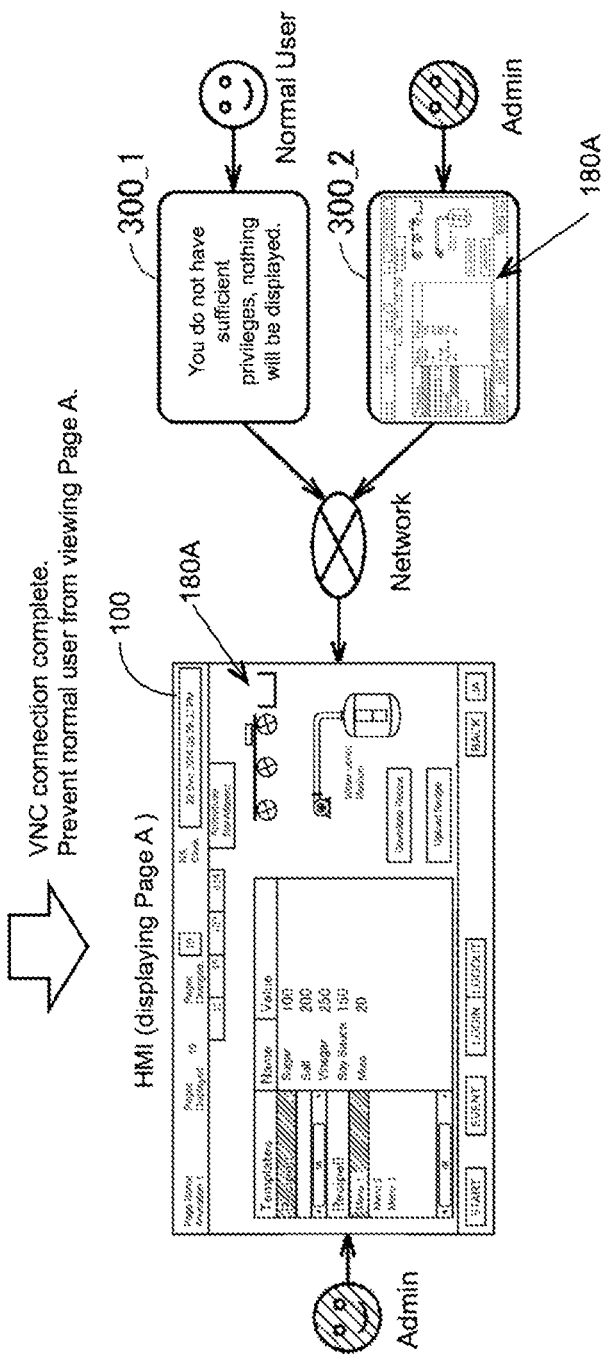
Figure 15C:
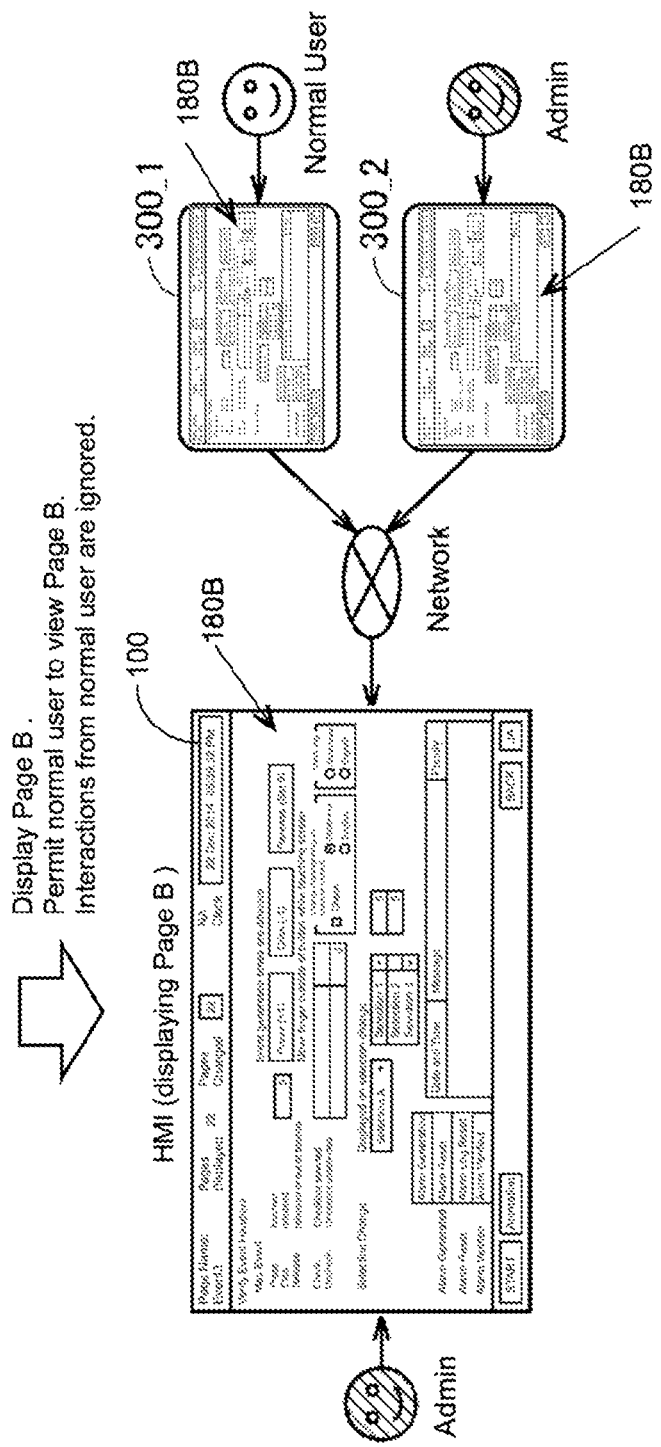

FIGS. 15A, 15B, and 15C are schematic views for describing a second example of the processing performed in the display 100 according to the embodiment. FIGS. 15A, 15B, and 15C illustrate a processing example where a normal user accesses the display 100 via a client device 300_1, and an administrator is accessing the display 100 via a client device 300_2, while an administrator is logged into the display 100. [0101] As illustrated in FIG. 15A, assume a normal user enters a normal user password into the client device 300_1 and attempts to establish a VNC connection to the display 100, and an administrator enters an administrator password into the client device 300_2 and attempts to establish a VNC connection to the display 100. In this example, both VNC connections from the client devices 300_1 and 300_2 are permitted to allow remote access to the display 100 (via VNC connection). However, as illustrated in FIG. 14, the normal user has limited permissions with respect to a portion of the pages on the HMI screen, therefore, the display 100 limits the HMI screen presented to the normal user in accordance with the permissions indicated in FIG. 14.

As illustrated in FIG. 15B, for instance, when instructed to display Page A of the HMI screen, the display 100 presents an HMI screen 180A corresponding Page A on its own display unit 122, and provides HMI screen 180A to the client device 300_2 being used by the user logged in as an administrator. Whereas, given that the viewing and interaction with Page A of the HMI screen is limited for the normal user, the display 100 does not provide the HMI screen 180A to the client device 300_1 being used by the user logged in as a normal user. At this point, the normal user does not have the privileges for displaying and HMI screen on the client device 300_1, and an alert message 310 to that effect is displayed thereon. However, the VNC connection is maintained between the display 100 and the client device 300_1. That is, the display 100 transmits a screen image representing the alert message 310 to the client device 300_1 instead of a screen image of the HMI screen 180A.

Next, as illustrated in FIG. 15C, when instructed to display Page B of the HMI screen, the display 100 presents an HMI screen 180B corresponding Page B on its own display unit 122, and provides HMI screen 180B to the client device 300_1 being used by the user logged in as a normal user, and to the client device 300_2 being used by the user logged in as an administrator. However, the normal user does not have the rights to interact with the screen, and thus even if the user enters some kind of input into the client device 300_1, the input is not considered valid. In other words, the display 100 treats any user interaction provided from the client device 300_1 as invalid.

As illustrated in FIGS. 15A, 15B, and 15C, when a user with less privileges attempts remote access (VNC connection), the viewing and interaction with the HMI screen can be controlled in accordance with preliminarily established privileges. Adopting this kind of method of restricting access prevents an administrator from unknowingly leaking information to a client device 300 logged on via a VNC connection, and prevents erroneous operations through the wrong input to the display. Additionally, in the above described second processing example, the environment can remain secure even in cases where a plurality of users having different privileges assigned are connected, such as during a videoconference or an emergency response situation.

In particular, the display 100 according to the embodiment can set a security level for each page in an HMI screen, and moreover, can set the security level for viewing and interactions independently. Therefore, the display 100 can support various kinds of uses such as never showing a normal user a specific page in an HMI screen, or permitting only viewing of a specific page.

Note that when a plurality of users assigned different privileges are viewing or interacting with the same HMI screen, there are many cases where it would be ideal to understand the security level one has or the status of other users. A number of modification examples are described below.

Figure 16A:
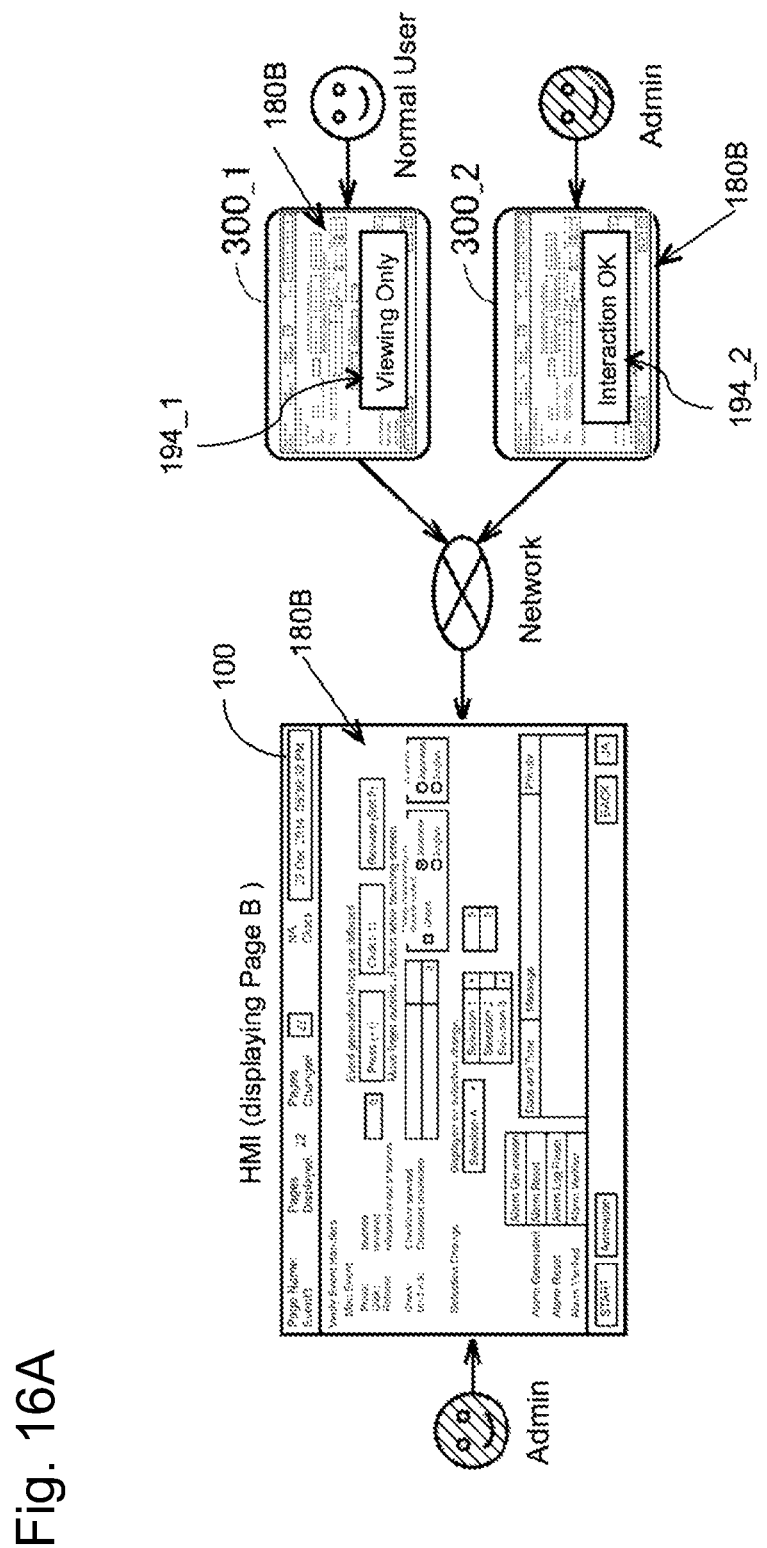
FIGS. 16A and 16B are schematic views for describing a modification to the second example of the processing performed in a programmable display according to an embodiment.
Figure 16B:
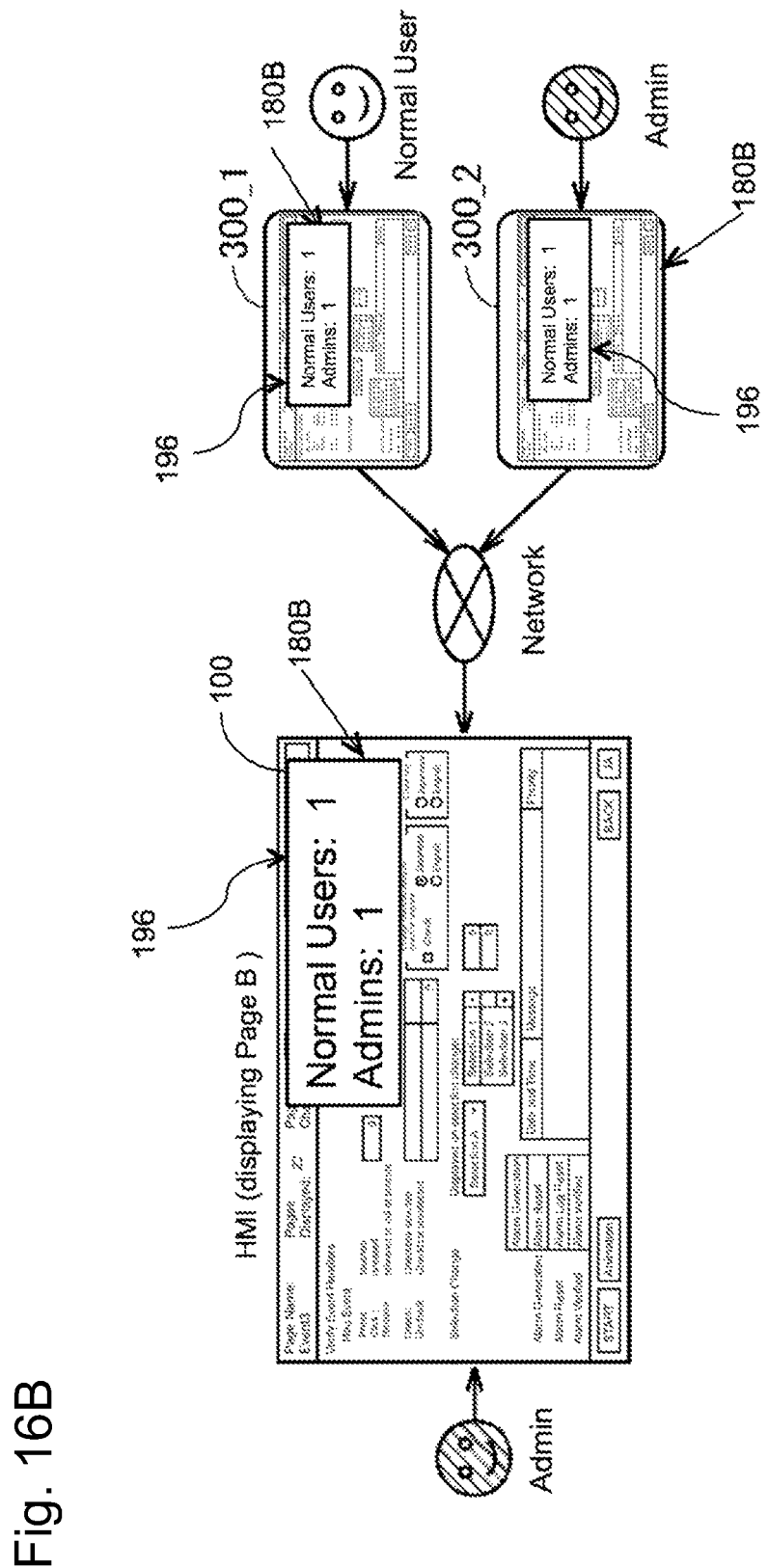

FIGS. 16A and 16B are schematic views for describing modifications to the second example of the processing performed in the display 100 according to the embodiment.

FIG. 16A illustrates a processing example where the privileges assigned to the client device 300 (i.e., to the user using the client device 300) can be understood at a glance. More specifically, pop-ups 194_1 and 194_2 representing the privileges assigned to each user are respectively displayed on top of the HMI screen 180B on the client device 300_1 and 300_2 respectively. In the example illustrated in FIG. 16A, the pop-up 194_1 includes a message: "View only" which is the privilege assigned to the normal user using the client device 300_1; similarly the pop-up 194_2 includes the message: "Interactions okay" which is a privilege assigned to the administrator using the client device 300_1.

A more specific method of implementation would be for the proxy 172 in the display 100 to overwrite the screen image use for providing the HMI screen with images corresponding to the pop-up 194_1 and 194_2, and to transmit the rewritten image to the client devices 300_1 and 300_2 respectively.

FIG. 16B illustrates a processing example where an administrator currently interacting with HMI screen can verify the state of the client devices 300 (or, the user privileges) with established VNC connections. More specifically, a pop-up 196 indicating the number of persons per each user account accessing the display 100 from the client device 300 via a VNC connection is placed on the HMI screen 180B that is being displayed on the display 100, as well as the client devices 300_1 and 300_2. In the example illustrated in FIG. 16B, the pop-up 196 includes a message indicating that the number of normal users using the client device 300_1 is one person, and the number of administrators using the client device 300_1 is one person.

Note that instead of the display format illustrated in FIG. 16B, an exclusive system page may be prepared for displaying the status of the client device 300 (or the privileges of the user) accessing the display via a VNC connection.

I. THE PROXY

Next, the functions and processes that take place in the proxy 172 (FIG. 8) in the display 100 is described. As above described, the proxy 172 provides a relay function that mediates the exchange of data between the VNC server 170 and one or a plurality of client devices 300.

I-1: The User Authentication Process

An authentication process is run between the proxy 172 and each of the client devices 300 in accordance with a predetermined procedure. Any desired and publicly known technique may be adopted as the procedure for the authentication process, however, the challenge-response protocol is usually suitable. With the challenge-response protocol, when a connection request is sent to the proxy 172 from a client device 300, the proxy 172 sends a challenge to the client device 300, and the client device 300 further sends a challenge-response in relation to the challenge. The proxy 172 then performs the authentication process on the basis of the challenge-response received, and response to the client device 300 indicating the client device is authenticated when the authentication process completes successfully. The client device 300 may establish a VNC connection with the display 100 through this series of processes.

Figure 17A:
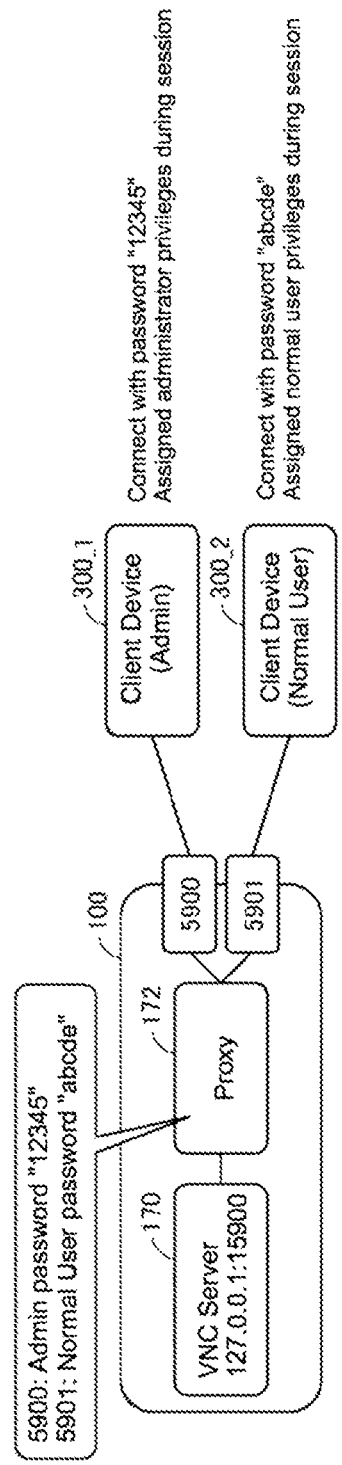
FIGS. 17A and 17B are diagrams for explaining an example of an implementation of user authentication in a display according to an embodiment.
Figure 17B:
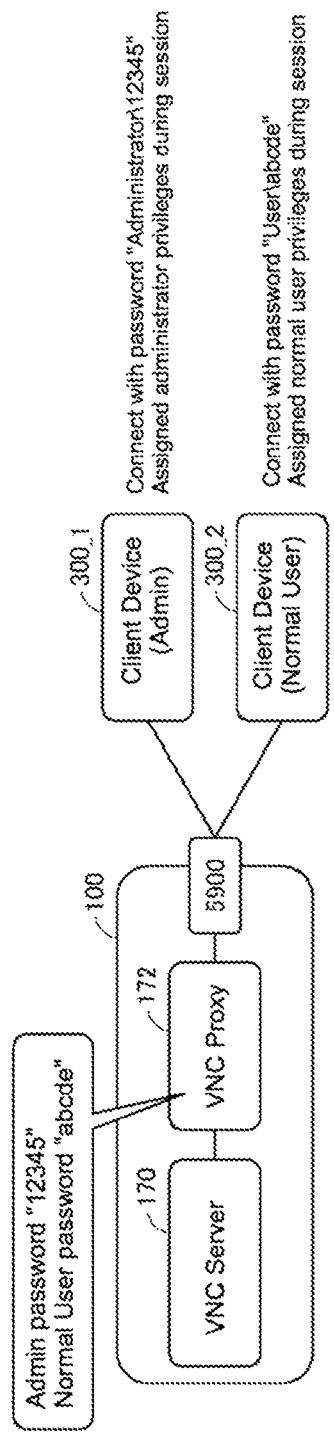

Note that in a general-purpose authentication process for establishing a VNC connection, there is no concept of a "user account"; authentication takes place using only a password. In other words, the challenge-response sent from the client device 300 to the proxy 172 contains only a password. In this case, the following kind of technique may be implemented in order to allow the general-purpose authentication process for establishing a VNC connection to use a user account and a password. FIGS. 17A and 17B are diagrams for explaining an example of an implementation of user authentication in a display 100 according to an embodiment.

Implementation Example: Case 1

In Case 1 of this implementation example, a unique port may be assigned to each user account to thereby identify the user account. For instance, as illustrated in FIG. 17A, two ports, i.e., port number 5900 and 5901 are setup in the proxy 172, with each of the port numbers being associated with an administrator and a normal user, respectively. Moreover, the proxy may be configured to allow usage of an administrator password and a normal-user password that are mapped to the specific port numbers.

Each user operates the client device 300 to specify the port corresponding to its own privilege and to request a VNC connection. Each user then enters the relevant password during the authentication process when establishing this VNC connection. For instance, an administrator specifies the port number 5900 and enters their own password: "12345". The proxy 172 reads the password corresponding to the port number specified by the client device 300, and determines whether or not the password from the client device 300 matches.

Adopting such an implementation, commonly known applications may be used to set the security level for each user account.

Implementation Example: Case 2

In Case 2 of this implementation example, a merging of the user account and the password may be used as the password in the authentication process. For instance, as illustrated in FIG. 17B, the proxy 172 is configured so that an administrator password and a normal-user password may be used. Each user operates the client device 300, and uses a predetermined separator when merging information about their group attribute and password, and sends the result as a password. For instance, a character string representing the group attribute "Administrator" and a character string of their password "12345" may be merged with a designated separator, e.g. "\" therebetween and the result entered. If receiving the password from the client device 300 unaltered, the proxy 172 may separate the two character strings based on the separator "\", and then run the authentication process. Note that when receiving an encrypted password from the client device 300, the proxy 172 may use character string obtained from encrypting the result of the two character strings in the authentication process.

Adopting such an implementation, commonly known applications may be used to set the security level for each user account.

I-2: Displaying the Status of the VNC Connection

The information maintained by the VNC server 170 can be reflected on the HMI screen presented on the display 100.

For example, a status screen indicating the states of the VNC connection managed by the VNC server 170 may be displayed as an HMI screen. This kind of status screen may be a list of the user name, the IP address of the client device 300 used by each user, and when the VNC connection started for the VNC connections.

A user may manually activate the status screen from a system menu; the status screen presents the state of the VNC connections. For instance, the user may select an icon on the HMI screen to activate the status screen. Alternatively, the detection of the VNC connection by the VNC server 170 may be a trigger event that activates the status screen. Yet another alternative, may be to activate the status screen in response to the selection of a button on the HMI screen through a user interaction.

Finally, displaying the state of the VNC connections may be utilized as a control component used on the HMI screen. Preparing this kind of control component allows the user to cause the state of the VNC connections to be displayed at any desired location or page. Additionally, an event-driven message may be generated on the HMI screen in accordance with the start of a VNC connection and the like. Lastly, an always-present status bar may be prepared to provide the state of the VNC connections.

In this manner, the information on the status of the VNC connection may be included in the HMI screen presented on the display 100.

I-3: Modification Examples

The above description, an example was given of using a VNC to realize a connection between the display 100 and the client device 300; however, other communication protocols may be adopted. Given that the display 100 according to the embodiment implements a proxy, there is no need to be limited to a specific communication protocol, and thus any desired communication protocol may be flexibly adopted. For example, a file transfer protocol (FTP), a hypertext transfer protocol, and the like may be used for the communication protocol.

When FTP is adopted as the communication protocol, the protocol should be implemented so that communication is only possible when a user having administrator privileges is logged in (or, only when a flag permitting FTP is on). By limiting the time period when this kind of FTP communication is permitted allows the system to protect the data that should not be accessed externally such as manufacturing data. In other words, it is sufficient to permit FTP communications from outside only in the case where an administrator is logged into the display 100.

An FTP connection may also be prohibited depending on the status of the display 100. For instance, the protocol may be configured so that file transfers cannot take place via FTP while the manufacturing devices operating. That is, ensuring that FTP is only possible when the manufacturing device is stopped protects the data such as manufacturing parameters that should not be updated while the manufacturing device is running.

Note that, the user may be warned during the FTP connection (i.e. when receiving files for sending files like). For instance, the user may be notified that an FTP transfer is taking place within message or an indicator to alert the user to the status. Alerting the user in this manner may prevent erroneous operation, such as powering down the display 100 during an FTP transfer.

Given that the settings of a normal FTP server do not change dynamically, more flexible operations may be possible by having the proxy change its mode of actions depending on the status of the display 100.

When the HTTP is adopted as the communication protocol, functions identical to using a VNC may be realized even when implementing a remote maintenance function that uses a web browser and the like.

J. ADVANTAGES

As above described a programmable display 100 according to the embodiments which provides functions that allow remote viewing and interaction with the content displayed thereon, is capable of appropriately preserving the security level of the content displayed even when providing these kinds of functions. Namely, compared to conventional devices the programmable display 100 according to the embodiments remains convenient, and improves the security level provided thereby.

More specifically, by adopting the following kinds of control the programmable display 100 prevents assigning unnecessary privileges to a client device 300.

For instance, the programmable display 100 can control the logging in and logging off of each user depending on the status of a VNC connection from a client device 300. Namely, the programmable display 100 according to the embodiment can change whether or not to display or to make a control component available dynamically for each control component placed on the HMI screen in accordance with the privileges assigned to the user operating the client device 300. Additionally, the programmable display 100 can control interaction or viewing via the VNC connection and the client device 300 depending on the privileges assigned to the user logged thereinto. The programmable display 100 can also control the limitations on the viewing and interaction with the HMI screen on a page-by-page basis, and the limitations on viewing and interaction that is made on the page level may be controlled in accordance with the privileges of the user operating the client device 300. Additionally, a plurality of user accounts may be created and privileges of mutually different levels established for each of the user accounts. For instance, creating a plurality of user accounts, such as an administrator, normal user, operator, and repair staff, each having different permissions, allows minute control of access to a plurality of pages in an HMI screen.

All aspects of the embodiments disclosed should be considered merely examples and not limitations as such. The scope of the present invention is not limited to the above description but to the scope of the claims, and is intended to include all equivalents and modifications allowable by the scope of the claims.

The invention claimed is:

1. A programmable display for connection to a control device, the programmable display comprising:
a processor and a memory;
an input/output interface; and
a display, wherein
the processor is configured with a program to perform operations comprising:
operation as a user manager configured to:
assign user access privileges to a plurality of users of the programmable display;
identify a user access privilege assigned to a first of the plurality of users, the first of the plurality of users accessing the programmable display;
prohibit simultaneous access to the programmable display from the first of the plurality of users and a second of the plurality of users when the user access privilege assigned to the first of the plurality of users is different from a user access privilege assigned to the second of the plurality of users; and
allow simultaneous access to the programmable display from the first of the plurality of users and the second of the plurality of users when the user access privilege assigned to the first of the plurality of users is the same as the user access privilege assigned to the second of the plurality of users;
operation as a rendering unit configured to:
generate an interface screen containing information from the control device in accordance with the user access privilege assigned to the first of the plurality of users, and
output the generated interface screen to the display; and
operation as a connection management unit comprising a proxy and a VNC server configured to:
in response to a user access request from an external device, establish a connection with the external device via the proxy, based on the user access privilege identified by the user manager, and
send, via the VNC server, the interface screen to the external device with which the connection is established.

2. The programmable display according to claim 1, wherein the processor is further configured with the program such that the user manager terminates access to the programmable display for the first of the plurality of users when the second of the plurality of users attempts to access the programmable display and the user access privilege assigned to the first of the plurality of users is higher than the user access privilege assigned to the second of the plurality of users.

3. The programmable display according to claim 1, wherein the processor is further configured with the program such that the user manager notifies the first of the plurality of users of the second of the plurality of users attempting to access the programmable display when the second of the plurality of users attempts to access the programmable display and the user access privilege assigned to the first of the plurality of users is higher than the user access privilege assigned to the second of the plurality of users.

4. The programmable display according to claim 3, wherein the processor is further configured with the program such that the user manager denies access to the programmable display to the second of the plurality of users in response to an instruction from the first of the plurality of users.

5. The programmable display according to claim 3, wherein the processor is further configured with the program such that the user manager terminates access to the programmable display for the first of the plurality of users in response to an instruction from the first of the plurality of users.

6. The programmable display according to claim 3, wherein the processor is further configured with the program such that the user manager permits the second of the plurality of users to access the programmable display with greater limitations than limitations on the first of the plurality of users in response to an instruction from the first of the plurality of users.

7. The programmable display according to claim 1, wherein the processor is further configured with the program such that the user manager restricts the second of the plurality of users from access to the interface screen when the user access privilege assigned to the first of the plurality of users is higher than the user access privilege assigned to the second of the plurality of users.

8. A method for controlling a programmable display for connection to a control device, the programmable display comprising: a display; a user manager; a rendering unit; a proxy; and a VNC server; the method comprising:
assigning, with the user manager, user access privileges to a plurality of users of the programmable display;
identifying, with the user manager, a user access privilege assigned to a first of the plurality of users, the first of the plurality of users accessing the programmable display;
prohibiting, with the user manager, simultaneous accesses to the programmable display from the first of the plurality of users and a second of the plurality of users when the user access privilege assigned to the first of the plurality of users is different from a user access privilege assigned to the second of the plurality of users;
allowing, with the user manager, simultaneous access to the programmable display from the first of the plurality of users and the second of the plurality of users when the user access privilege assigned to the first of the plurality of users is the same as the user access privilege assigned to the second of the plurality of users;
generating, with the rendering unit, an interface screen containing information from the control device in accordance with the user access privilege assigned to the first of the plurality of users;
outputting the interface screen to the display;
establishing, with the proxy, in response to a user access request from an external device, a connection with the external device on the basis of the identification of the user access privilege assigned to the first of the plurality of users; and
sending, with the VNC server, the interface screen to the external device with which the connection is established.

9. The method according to claim 8, wherein prohibiting, with the user manager, simultaneous accesses to the programmable display form the first of the plurality of users and the second of the plurality of users when the user access privilege assigned to the first of the plurality of users is different from the user access privilege assigned to the second of the plurality of users comprises terminating access to the programmable display for the first of the plurality of users when the second of the plurality of users attempts to access the programmable display and the user access privilege assigned to the first of the plurality of users is higher than the user access privilege assigned to the second of the plurality of users.

10. The method according to claim 8, further comprising notifying, with the user manager, the first of the plurality of users of the second of the plurality of users attempting to access the programmable display when the second of the plurality of users attempts to access the programmable display and the user access privilege assigned to the first of the plurality of users is higher than the user access privilege assigned to the second of the plurality of users.

11. The method according to claim 10, wherein prohibiting, with the user manager, simultaneous access to the programmable display from the first of the plurality of users and the second of the plurality of users when the user access privilege assigned to the first of the plurality of users is different from the user access privilege assigned to the second of the plurality of users comprises denying access to the programmable display to the second of the plurality of users in response to an instruction from the first of the plurality of users.

12. The method according to claim 10, wherein prohibiting, with the user manager, simultaneous access to the programmable display from the first of the plurality of users and the second of the plurality of users when the user access privilege assigned to the first of the plurality of users is different from the user access privilege assigned to the second of the plurality of users comprises terminating access to the programmable display for the first of the plurality of users in response to an instruction from the first of the plurality of users.

13. The method according to claim 10, wherein prohibiting, with the user manager, simultaneous access to the programmable display from the first of the plurality of users and the second of the plurality of users when the user access privilege assigned to the first of the plurality of users is different from the user access privilege assigned to the second of the plurality of users comprises permitting the second of the plurality of users to access the programmable display with greater limitations than limitations on the first of the plurality of users in response to an instruction from the first of the plurality of users.

14. The method according to claim 8, wherein prohibiting, with the user manager, simultaneous access to the programmable display from the first of the plurality of users and the second of the plurality of users when the user access privilege assigned to the first of the plurality of users is different from the user access privilege assigned to the second of the plurality of users comprises restricting the second of the plurality of users from access to the interface screen when the user access privilege assigned to the first of the plurality of users is greater than the user access privilege assigned to the second of the plurality of users.

15. A non-transitory computer-readable medium comprising instructions that, when executed, cause a processor to control a programmable display comprising: a display; a user manager; a rendering unit; a proxy; and a VNC server, for connection to a control device; the instructions causing the processor to perform operations comprising:
assigning, with the user manager, user access privileges to a plurality of users of the programmable display;
identifying, with the user manager, a user access privilege assigned to a first of the plurality of users, the first of the plurality of users accessing the programmable display;
prohibiting, with the user manager, simultaneous accesses to the programmable display from the first of the plurality of users and a second of the plurality of users when the user access privilege assigned to the first of the plurality of users is different from a user access privilege assigned to the second of the plurality of users;

allowing, with the user manager, simultaneous access to the programmable display from the first of the plurality of users and the second of the plurality of users when the user access privilege assigned to the first of the plurality of users is the same as the user access privilege assigned to the second of the plurality of users;

generating, with the rendering unit, an interface screen containing information from the control device in accordance with the user access privilege assigned to the first of the plurality of users;

outputting the interface screen to the display;

establishing, with the proxy, in response to a user access request from an external device, a connection with the external device on the basis of the identification of the user access privilege assigned to the first of the plurality of users; and sending, with the VNC server, the interface screen to the external device with which the connection is established.

16. The non-transitory computer-readable medium of claim 15, wherein prohibiting, with the user manager, simultaneous accesses to the programmable display form the first of the plurality of users and the second of the plurality of users when the user access privilege assigned to the first of the plurality of users is different from the user access privilege assigned to the second of the plurality of users comprises terminating access to the programmable display for the first of the plurality of users when the second of the plurality of users attempts to access the programmable display and the user access privilege assigned to the first of the plurality of users is higher than the user access privilege assigned to the second of the plurality of users.

17. The non-transitory computer-readable medium of claim 15, wherein prohibiting, with the user manager, simultaneous access to the programmable display from the first of the plurality of users and the second of the plurality of users when the user access privilege assigned to the first of the plurality of users is different from the user access privilege assigned to the second of the plurality of users comprises restricting the second of the plurality of users from access to the interface screen when the user access privilege assigned to the first of the plurality of users is greater than the user access privilege assigned to the second of the plurality of users.

18. The non-transitory computer-readable medium of claim 15, the instructions further comprising notifying, with the user manager, the first of the plurality of users of the second of the plurality of users-attempting to access the programmable display when the second of the plurality of users attempts to access the programmable display and the user access privilege assigned to the first of the plurality of users is higher than the user access privilege assigned to the second of the plurality of users.

19. The non-transitory computer-readable medium of claim 18, wherein prohibiting, with the user manager, simultaneous access to the programmable display from the first of the plurality of users and the second of the plurality of users when the user access privilege assigned to the first of the plurality of users is different from the user access privilege assigned to the second of the plurality of users comprises denying access to the programmable display to the second of the plurality of users in response to an instruction from the first of the plurality of users.

20. The non-transitory computer-readable medium of claim 18, wherein prohibiting, with the user manager, simultaneous access to the programmable display from the first of the plurality of users and the second of the plurality of users when the user access privilege assigned to the first of the plurality of users is different from the user access privilege assigned to the second of the plurality of users comprises terminating access to the programmable display for the first of the plurality of users in response to an instruction from the first of the plurality of users.

* * * * *